US007496556B2

(12) United States Patent
Huttel et al.

(10) Patent No.: US 7,496,556 B2
(45) Date of Patent: Feb. 24, 2009

(54) UPIKM DATABASE SYSTEM WITH INTEGRATED XML INTERFACE

(75) Inventors: Jeffrey Huttel, West Hempstead, NY (US); Arthur Finkel, Great Neck, NY (US)

(73) Assignee: Epiq eDiscovery Solutions. Inc., New York, NY (US)

( * ) Notice: Subject to any disclaimer, the term of this patent is extended or adjusted under 35 U.S.C. 154(b) by 0 days.

(21) Appl. No.: 11/025,801

(22) Filed: Dec. 29, 2004

(65) Prior Publication Data

US 2005/0256900 A1  Nov. 17, 2005

Related U.S. Application Data

(63) Continuation of application No. 10/012,482, filed on Dec. 12, 2001, now abandoned.

(51) Int. Cl.
G06F 7/00 (2006.01)
G06F 17/30 (2006.01)
(52) U.S. Cl. ..................... 707/1; 707/2; 707/4
(58) Field of Classification Search ............... 707/104, 707/104.1, 1–5, 10, 100, 101, 200, 201
See application file for complete search history.

(56) References Cited

U.S. PATENT DOCUMENTS 6,289,513 B1    9/2001  Bentwich
6,327,574 B1   12/2001  Kramer et al.
6,418,448 B1*   7/2002  Sarkar ..................... 707/104.1
6,801,916 B2* 10/2004  Roberge et al. ............ 707/101
6,957,214 B2* 10/2005  Silberberg et al. ............ 707/4
2003/0018616 A1*  1/2003  Wilbanks et al. ............... 707/2
2003/0041053 A1*  2/2003  Roth ............................ 707/3
2004/0034651 A1*  2/2004  Gupta et al. ................. 707/102

* cited by examiner

*Primary Examiner*—Don Wong
*Assistant Examiner*—Merilyn P Nguyen
(74) *Attorney, Agent, or Firm*—Wilmer Cutler Pickering Hale & Dorr LLP

(57) ABSTRACT

A UPIKM database system with an integrated XML interface is disclosed. The system is more efficient and returns search requests more rapidly in light of the database structure and interaction. This is in-part accomplished by each of the tables having only one key to distinguish a record that is to be used by one application from the record of another application. The system combines up to two database system operations into an integrated system such that up to two search methods can be performed with each search request and the retrieved information is based on these two search methods. The search requests are generated by the system user through the XML interface such that the requests are presented to the UPIKM database system in XML and the responses from the UPIKM database system to the XML interface are in XML. This structure permits a variety of applications to be supported by the present invention with a minimal need for the use of programmers.

54 Claims, 9 Drawing Sheets

| FIG. 2A |
| FIG. 2B |

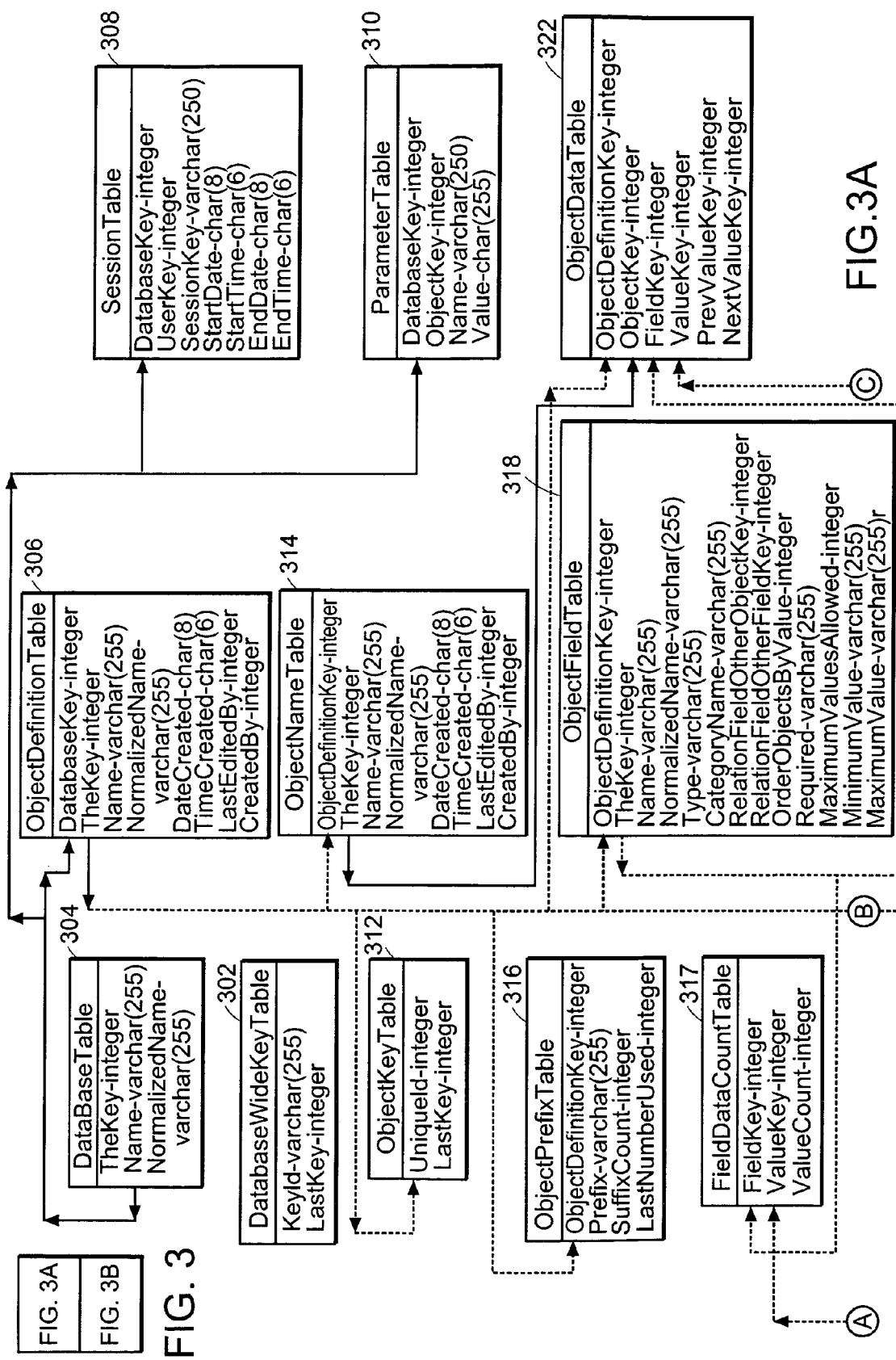

ObjectFieldTable 400

| Obj. Def. Key[a] 402 | The Key 404 | Name (varchar (255)) 406 | Normalized Name (varchar (255)) 408 | Type (varchar (255)) 410 | Category Name (varchar (255)) 412 | Relation Field Other Object Key 414 | Relation Field Other Field Key 416 | Order Objects by Value 418 | Required (varchar (255)) 420 | Maximum Values Allowed 422 | Minimum Value (varchar (255)) 424 | Maximum Value (varchar (255)) 426 |
|---|---|---|---|---|---|---|---|---|---|---|---|---|
| 303 | 378 | Engine Displacement | ENGINE DIS-PLACEMENT | Integer | Integer | Blank | Blank | Blank | R | 0 | 100cc for any Vehicle | 3500cc for any Vehicle |
| 303 | 383 | Fuel Type | FUEL TYPE | Member | Member | Blank | Blank | Blank | R | 2 | 1=Diesel | 2=Gasoline |
| 303 | 398 | Tire Type | TIRE TYPE | Member | Member | Blank | Blank | Blank | O | 30 | 1=first tire type on tire chart | 30=last tire type on tire chart |
| 303 | 403 | Vehicle Weight | VEHICLE WEIGHT | Float | Float | Blank | Blank | Blank | R | 0 | 10=vehicles must be more than this | 100000=vehicles must be less than this |
| 303 | 434 | Transmission Type | TRANSMISSION TYPE | Member | Member | Blank | Blank | Blank | R | 2 | 1=Automatic | 2=Manual | a. "Obj. Def." is for "Object Definition".

FIG. 4

UPIKM DATABASE SYSTEM WITH INTEGRATED XML INTERFACE

FIELD OF THE INVENTION

The present invention relates systems and methods used in a knowledge-based system. More specifically, the present invention relates to systems and methods that are knowledge-based systems that may be used for database management.

BACKGROUND OF THE INVENTION

Now that many companies have instituted a wide variety of the computer-based information management systems, there is great tendency to input all types of data to these systems. This has proliferated with the use of wide-area networks (WANs), municipal-area networks (MANs), local-area networks (LANs), and intranets by companies, groups or divisions within a company that are geographically separated, or groups of users without any corporate affiliation. In many cases, information is input from various locations that is then stored in a number of ways with the most popular being in a number of databases. These databases may be structured to receive information of a particular type or varied. This information is usually loaded into a database is such a way that, hopefully, it can be readily retrieved.

Databases that receive the information from the various users are usually overlaid with a database management system (DBMS) that will include database applications. Typically, DBMSs are configured using four general types of data-structure classes. These are hierarchic, network, relational, and semantic data-structure classes. In particular, the relational data-structures class, with its association with DBMS, has evolved into what is now referred to as Relational Databases.

Relational databases are now viewed, in many cases, as the standard for the design of both large and small databases. The simplest model of a database would consist of a single table, which includes a number of fields for each record that is desired to be stored. In such a system, it will be necessary to repeat a great deal of information within the database. This makes it very difficult to maintain the data, and there may be resulting data errors based on inconsistent records. However, if a relational database is used, activities in the database will be related through, e.g., a customer record. The database application software will manage groups of records that are related.

As an example, if there is a catalog-based sales system, information may be stored in three tables. The tables could be titled Name, Order, Items Ordered. Each of these tables, in turn, would have subsections of information. The subsections for the Name table could include the spelling of the name; the street address; city, state, and zip-code; and phone number. The Order table could have the subsections invoice number, date, and catalog number. Finally, the Items Ordered table could have the subsections catalog item number ordered, quantity, and price. If this information is handled by a relational database system, each of the Order table entries will also include a name identification (NID) field and the Items Ordered table will also include an order number (ONB) field. These two new fields are foreign keys of the relational database and provide a serial link for the records of the database.

The creation of the database in the method just described alleviated the need to repeat the Name table data for each Order table record because you can rely on the serial linking, through the NID. Accordingly, if there is, for example, a change in the address associated with a particular name in the Name record, this change will be made for every order associated with that Name. This same process is applied to the second link, ONB.

In a majority of the cases, the queries that are developed in a relational database are based on Structured Query Language ("SQL"). Using SQL to develop a query, the query, for example, could request to display all of the orders placed by someone with a particular name. The Name and Orders tables are linked by the NID. Once linking of the two tables has taken place, the number of orders may be determined for a particular Name.

A query in SQL, with regard to obtaining information from the three tables defined previously, would consist of a SELECT command followed by a FROM command. The SELECT command or keyword defines the desire to select records from the tables. This could be SELECT name; street address; city, state, and zip-code; order invoice number; and order date. The command or keyword that follows is FROM. The FROM command or keyword indicates from where the data comes. Accordingly, the FROM command or keyword in the previous example would indicate the data was coming from the Name table and the Order table. The FROM command will be associated with the appropriate JOIN command which will provide the proper connection of the data from the two tables.

The decision must be made as to how to maintain the integrity of the database files when there are deletions. If cascading is the desired method, if there is a change in the NID in the Name table, then there would be a change in the related records in the Order table. The second choice is that deletions will not be permitted if there are related records. In this case, if there is a deletion of a NID and there are related records in the Order table, the deletion of the NID will not be permitted until their related records are deleted or are no longer related to the NID being deleted.

The basic structure of a relational database that uses SQL to effect queries has been described. Now, a bit more in depth view will be undertaken to set forth SQL in the context of the present invention.

As discussed above, tables are to represent things in the real world. In a particular database, the row of a table is to be unique. Each of the columns represents a specific field for each table row. This is carried out by each table having a primary key that is usually a column of the table having unique values for the table. Each table will have only one primary key. Together all of the columns of the table with unique values are candidate keys from which the primary key is selected. The other columns are alternate keys. A simple key is made up of one column where a composite key is made up of two or more columns. The easiest way to choose the primary key is to select one column if you can.

The main use of primary keys is for creating relationships between multiple tables in a database. This concept involves the use of foreign keys. A foreign key in a table references a primary key in another table. This joining relationship is the basis of relational database theory. For example, the primary key in a first table would be a foreign key in a second table. If desired, these table-to-table relationships may continue infinitely. They may be a one-to-one relationship, a one-to-many relationship, or a many-to-many relationship, which in reality are multiple one-to-many relationships.

The efficiency of the database tables is accomplished by normalization to remove redundancies from the tables. The three general normalization forms are the First, Second, and Third Norm Forms. The First Norm Form is that for every row-by-column position in a particular table, is the only one value. The Second Norm Form is that every non-primary key column is dependent on the primary key. And, the Third Norm Form is that all of the non-primary key columns are independent of one another. There are higher Norm Forms that solve certain specific inadequacies in the first three, but principally, normalization is satisfied by satisfying the First, Second, and Third Norm Forms.

The integrity rules are of two types: General and Database-Specific. The General Integrity rules may be either Entity Integrity or Referential Integrity. The Entity Integrity rule is that the primary keys cannot have missing data. The Referential Integrity rule is that a database must not contain any unmatched foreign key values. In following these rules, if a referenced primary key changes or a row is deleted, the system may take one of three options. First and second, it may cascade or prevent the change, as described before. Third, for deletions, the system may set all of the foreign keys values associated with the deletion to zero or null.

Database-Specific Integrity rules are ones that are specific to a particular database. These are ones that the database creator develops for enhancing his/her database and especially database management.

SQL was discussed briefly above as a query language for relational databases. is particularly useful to create and manipulate relational databases. The SQL commands are divided into two groups. These are Data Definition language ("DDL") and Data Manipulation Language ("DML"). DDL includes the commands that are used to create and delete databases and databases objects. On the other hand, DML is used to insert, retrieve, and modify data once a database is defined with DDL.

The four basic commands of DDL are CREATE, USE, ALTER, and DROP. CREATE is a command used to establish a database in a system. The CREATE command may also be used to create tables in a database. USE is a command that is used to specify the database that is desired to work within the system. ALTER is a command that is used once a table is created to modify the definitions on it. That is, changes to the structure of the table may be made without deleting and recreating it. DROP is a command that is used to remove entire database structures from a database.

DML, as stated, is used to retrieve, insert, and modify database information. The DML commands INSERT, SELECT, UPDATE and DELETE are used during routine operations of the database. INSERT is a command that is used to add records to an existing table. As an example, INSERT could be used to add new rows to the existing table. SELECT is a command that is used to retrieve specific information from an operational database. It may be tailored narrowly or broadly. UPDATE is a command that is used to modify information contained in an existing table. This may be done for an individual cell or for more than one cell of values. DELETE is a command that is used to remove a record from an existing table.

The forgoing SQL description provides the basic concepts that are used with relational databases. Although it exists, extensible mark-up language ("XML"), which is the successor to HTML, has not been used to any great extent with relational databases that use SQL as the querying language.

There are four main types of applications that would particularly benefit from the use of XML. The first type is applications that require the user to mediate between two or more heterogeneous databases. The second type is applications that attempt to distribute a significant proportion of the processing load from a server to the user. The third type is applications that require the user to present different views of the same data to different users. The fourth type is applications in which intelligent users attempt to tailor information discovery to the needs of individual users. Accordingly, it would be useful to apply XML to relational databases to effect better system operation.

There is the need for improved methods for relational database management that makes use of XML for ease in the use of database systems, and provides increased speed and efficiency in the manipulation and retrieval of information.

SUMMARY OF THE INVENTION

The present invention is a Universal Programming Interface to Knowledge Management ("UPIKM") database system with an integrated XML interface. The system of the present invention is capable of handling simple database operations, such as those associated with a telephone address book, to complex database operations, such as those associated with data mining with varied data relationships. The system of the present invention includes a database system to track information that will permit developers with basic programming skills to create applications that use the information. The system of the present invention may be used in WANs, LANs, MANs, intranets, the Internet, or other global, computer-based communications networks.

The UPIKM database system with the integrated XML interface of the present invention is flexible enough to be able to handle many different knowledge-based management systems that require at least one database. Moreover, the UPIKM database system with the integrated XML interface requires minimal database administrator assistance for the addition and deletion of databases with different fields.

The UPIKM database system portion of the present invention may include one or two separate database types. When there are two database types used, the first database type is an SQL-compliant relational database and the second database type is a text search engine database. This second database type contains the information that is required to perform text-based searches on the data in the SQL-compliant relational database. Once the two databases are created, application developers may use the UPIKM interface to communicate with the system databases using XML without the assistance of administrators.

The first database, the SQL-compliant database, is created with a predetermined number of tables. Similarly, the second database, the text search engine database, is created with a predetermined number of tables. This predetermined number of tables for the first and second databases, respectively, may vary according to system design needs.

The UPIKM database system portion of the present invention has databases that are capable of handling many different types of information and still be efficient in the rapid return requested information. This is carried out in large part by minimizing the needed number of SELECT calls to find records in the tables. This is facilitated by each of the tables having only one primary key to distinguish a record that is to be used by one application from the record of another application.

The UPIKM database system with the integrated XML interface does not have any regard for the type of information that is included in the first and second databases. Accordingly, all data that is input in the databases of the UPJKM database system portion of the system of the present invention is text searchable. This includes numeric and floating point values.

UPIKM database system with the integrated XML interface is a multi-layered, object-oriented system. It contains objects that encapsulate communications with the SQL-compliant and text search engine databases. A significant advantage of the UPIKM database system with the integrated XML interface is that the system user does not have to know the details of the SQL-compliant or text search engine database to be able to use the system. The XML layer, where the XML interface resides is used to communicate with UPIKM database system so that any application that uses XML may be integrated with the UPIKM database system.

The XML interface portion of the system of the present invention permits the user to make requests in XML to the UPIKM database system. The UPKIM database system responds in XML so that the XML interface may be used to transmit the response to the system user. The XML interface permits a predetermined set of requests to be made of the UPIKM database system. This predetermined number of requests may be increased or decreased depending on the XML interface design and the structure of the UPIKM database system. The combination of the XML interface and UPIKM database system provides a means by which a system user may efficiently and rapidly obtain desired information in the structured databases with minimal need for programmers.

In the embodiment of the present invention that includes only one database type, the database type is an SQL-compliant database. In this system of the preset invention, the text search engine database is not created. As such, the searching of the system databases is performed by conventional methods used for searching and retrieving data information from databases. The SQL-compliant database and its operation is substantially the same as the one described for the embodiment of the present invention that includes both the SQL-compliant database and the text search engine database.

An object of the present invention is to provide a UPIKM database system with an integrated XML interface that more efficiently manages information manipulation and retrieval.

Another object of the present invention is to provide a UPIKM database system with an integrated XML interface that more rapidly manages information manipulation and retrieval.

A further object of the present invention is to provide a UPIKM database system that integrates with an XML interface such that communications between the XML interface and the UPIKM database system is preferably in XML.

A yet further object of the present invention is to provide a UPIKM database system that has two interactive databases, a SQL-compliant database and a text search engine database, for more efficiently and rapidly managing information manipulation and retrieval.

Another object of the present invention is to provide a UPIKM database system that has at least an SQL-compliant database for more efficiently and rapidly managing information manipulation and retrieval.

An object of the present invention is to provide a UPIKM database system with an integrated XML interface that requires minimal administrator assistance for the addition and deletion of databases with different fields.

Another object of the present invention is to provide a UPIKM database system that integrates an XML interface such that communications between the UPIKM database system and the system user through the XML interface is in XML.

These and other objects will be disclosed in greater detail in the remainder of the specification, the attached figures, and in view of the appended set of claims directed to the present invention.

BRIEF DESCRIPTION OF THE DRAWINGS

FIG. 4 is a representative ObjectField Table shown in FIG. 3.

DETAILED DESCRIPTION OF THE DRAWINGS

The present invention is a UPIKM database system that integrates a XML interface. The system of the present invention is more efficient and returns search requests more rapidly in light of the database structure and interaction. The present invention in one embodiment combines up to two (or more) database system operations into a single integrated system such that two (or more) search methods can be performed with each search request and the retrieved information is based on these two search methods. Another embodiment of the present invention includes at least one database system operation that is used to perform the necessary actions for processing the search requests and the retrieval of data information.

According to the present invention, search requests are generated by the system user through the XML interface such that the requests are presented to the UPIKM database system in XML and the responses from the UPIKM database system to the XML interface are in XML. This structure permits a variety of applications to be supported by the present invention with a minimal need for programmers.

Figure 1:
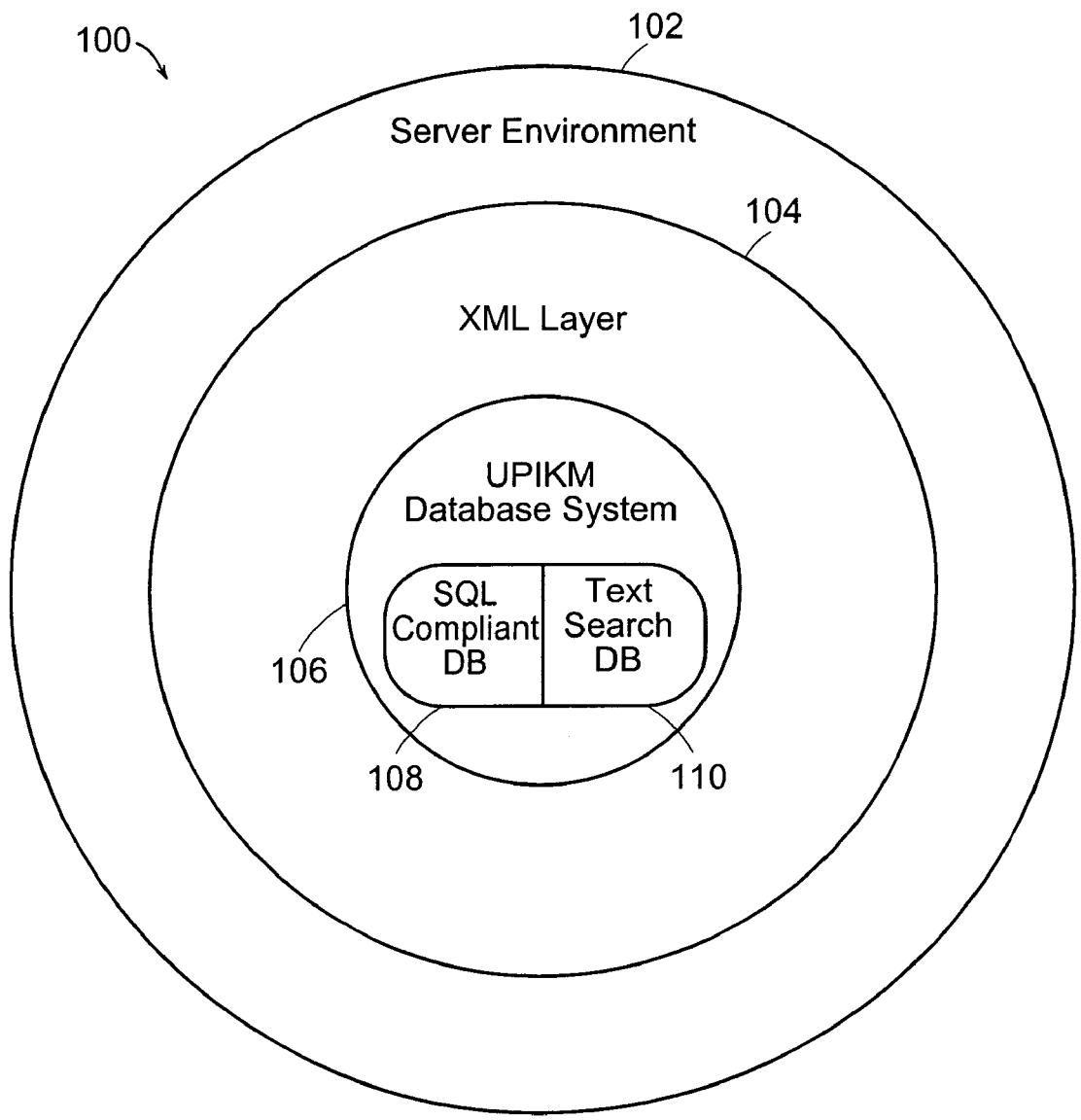
FIG. 1 shows a general diagram of the system of the present invention that includes the UPIKM database system that integrates an XML interface.

FIG. 1, generally at 100, shows a general schematic diagram of the system of the present invention that includes the UPIKM database system and associated XML layer in a server environment. Referring to FIG. 1, server environment 102 preferably is the domain of the UPIKM database system that has an integrated XML layer. Server environment 102 provides the mechanism through which the system of the present invention may be associated with a LAN, a MAN, a WAN, an intranet, or the Internet. Accordingly, a LAN, a MAN, a WAN, an intranet, or the Internet may access the server environment of the present invention via hardwiring, an air interface, or other type of network arrangement.

The UPLKM database system database with the integrated layer exists within the server environment. As is shown, XML layer 104 surrounds UPLKM database system 106. The XML layer preferably includes the XML interface. The XML interface, which will be described in greater detail subsequently, will receive system requests from system users in a XML format and transmit these system requests in XML to UPIKM database system 106. UPIKM database system 106 will transmit the results of the search retrieved from the databases to the XML interface in XML, which in turn will transmit such system results to the system user through the network of the LAN, MAN, WAN, intranet, or the Internet.

UPIKM database 106 may include one or two types of databases. In a preferred embodiment, it will include two database types and in another embodiment it will include one database type. First the system that has two database types will be described and then the system with one data base type will be described. However, it is understood that there may be more than two database types that are integrated and still be within the scope of the present invention.

According to the embodiment that has two database types, the first type is SQL-compliant database 108 that operates in a manner consistent with conventional SQL-compliant databases except with regard to its integration with the second type of database. The second type of database is text search engine database 110. This database operates in a manner consistent with conventional text search engine databases except for its integration with SQL-compliant database 108. The integration of these two different types of databases according to the database structure of the present invention provides novel advantages in efficiency and speed of response over database systems that may use two different types of database systems but are not integrated as instructed by the present invention.

UPIKM database system shows SQL-compliant database 108 and text search engine database 110 as being two separate databases. This, as stated, is the preferred embodiment of the system of the present invention. However, it is contemplated that a single custom database may be created that incorporates the features of both of these types of databases and still be within the scope of the present invention.

Figures 2, 2A:
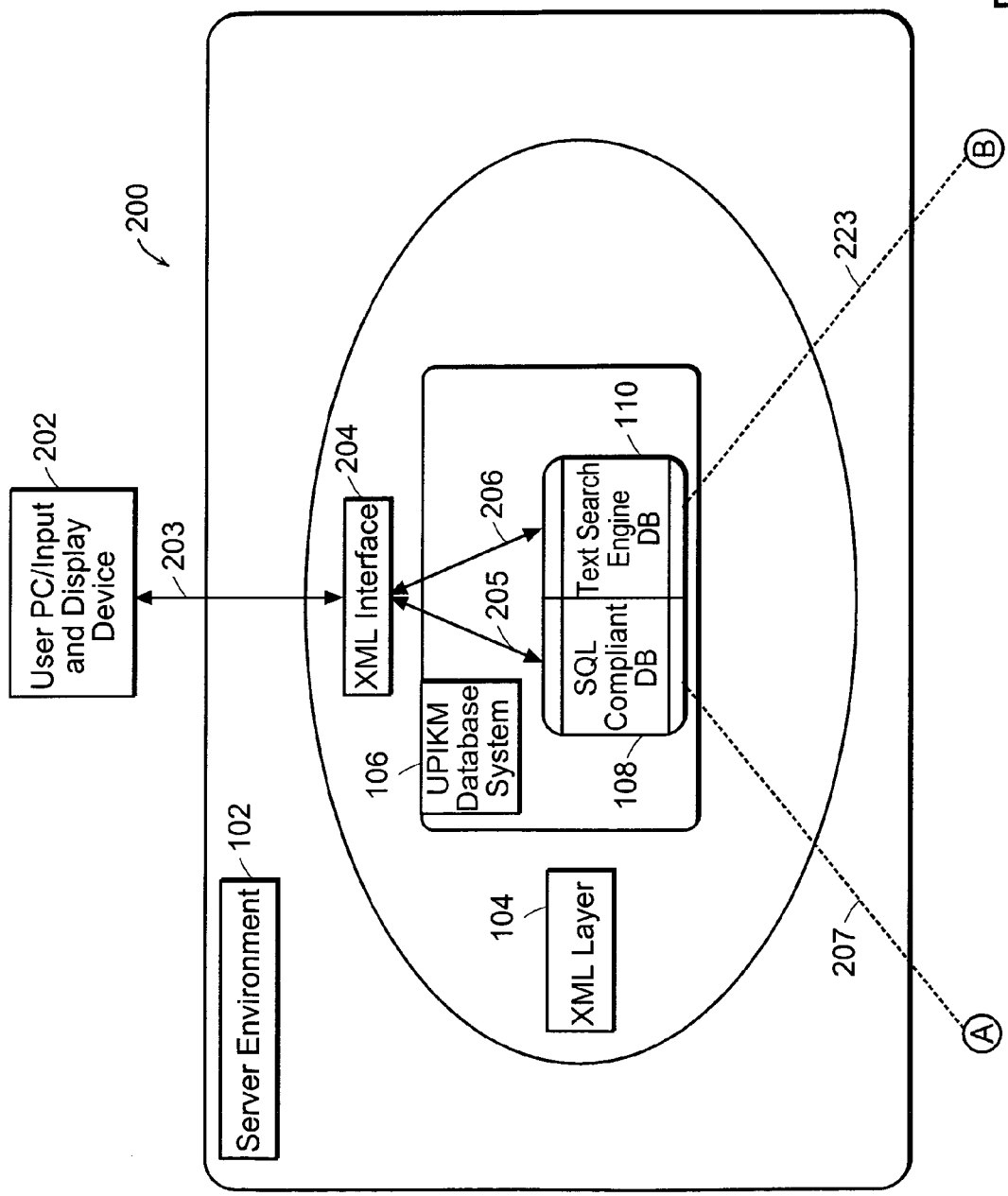
FIG. 2 is a more detailed diagram of the present invention shown in FIG. 1 that includes the UPIKM database system that integrates the XML interface and uses two separate database types.
Figure 2B:
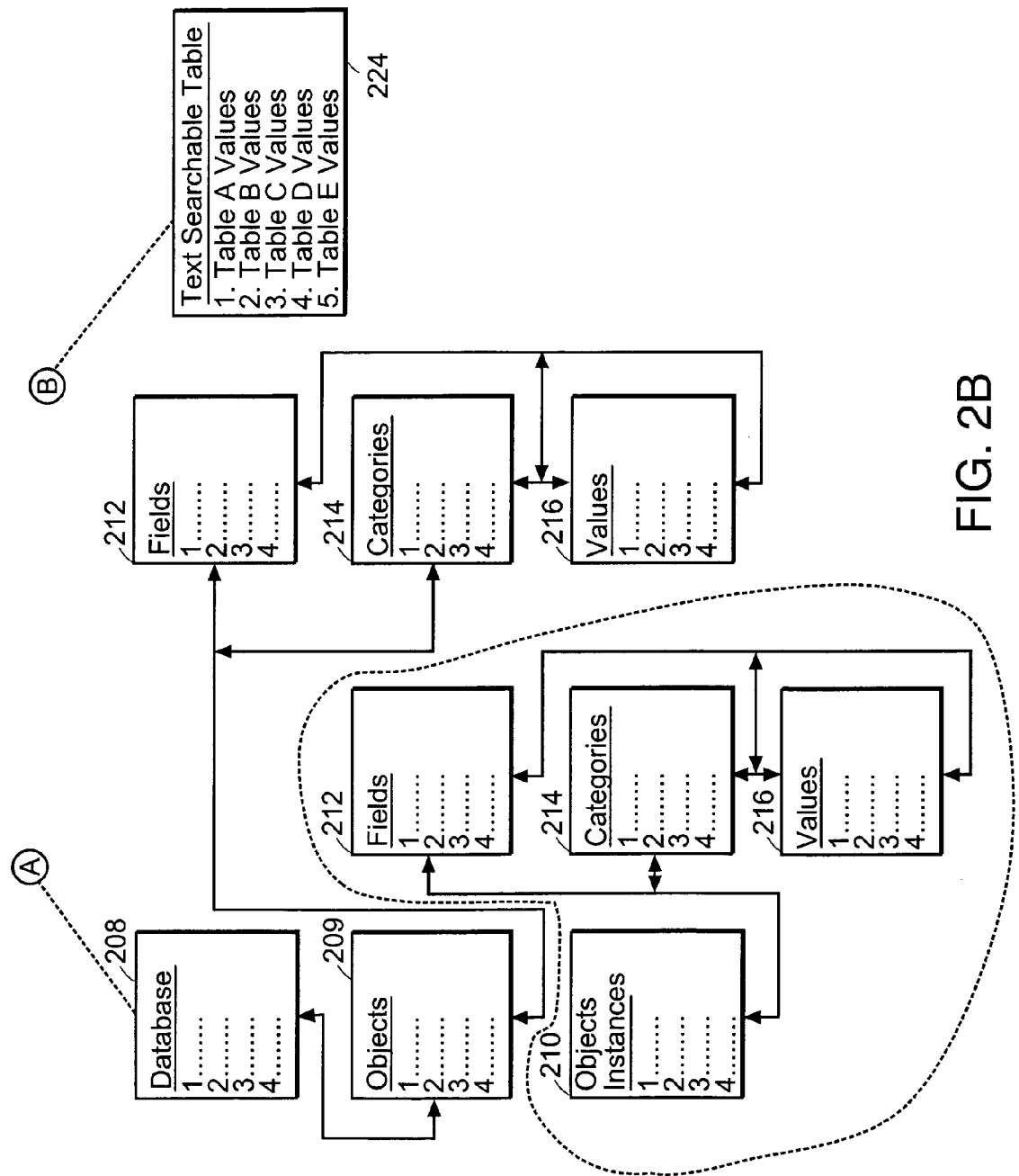

FIG. 2 shows a more detailed diagram of the present invention than is shown in FIG. 1. In describing the system of the present invention, the following terms will have the meanings as set forth below:

UPIKM Database: This is the combination of the SQL-compliant database and text search engine database.

Database: This refers to a subset of the UPIKM Database that maintains information for an identifiable application.

Objects: These are the types of entities that have data associated with them. For example, "Document," "Person," and "Company" may be Objects.

Fields: These are pieces of information that may be associated with an Object. For example, "LastName" may be a "Field" associated with a "Person" Object, and "From" and "Document Type" may be "Fields" associated with a Document Object.

Categories: These are sets of Values of a particular type that are associated with Fields. For example, "People" may be a Category that contains the set of names that a Document could be "From."

Values: These are of what Categories may consist of. The "Last Name" Category may have a set of Values such as "Doe," "Smith," and "Jones." The set of Values in a Category shares the same "Type."

In considering the UPIKM database, the SQL-compliant database will contain information and the text search engine database will hold values. When these databases are created, it is also contemplated but not required that new tables and indexes be also created.

In considering "Databases," there may be many databases in the SQL-compliant database. For example, one database may be created to track documents while another may be created to track stock trades. These two databases may co-exist in a single UPIKM database. It is also contemplated that these two databases may be kept in separate UPIKM databases.

Above, some simple examples of Objects are set forth. In the system of the present invention, a Database may have a number of Objects associated with it. An "Object Instance" is found when a particular instance of an Object is of a particular entity type. For example, "John Doe" and "Sarah Miles" are separate instances of a "Person" Object. As shown, there may be more than one Object Instance for any particular Object.

Generally, Object Instances will have unique names associated with them. This convention will permit two users or application programs to communicate about a particular Object Instance and not refer to the same entity.

Values have been defined above. As defined, a set of Values in a Category will be of the same type. Category types in a particular UPIKM database system are according to the following Table:

TABLE 1

Category Types for Values

| Category Type | Description |
|---|---|
| Member | A 255 Character ASCII Value (e.g., "Doe") |
| Integer | An integer Value (e.g., "10") |
| Float | A fractional Value (e.g., "2.3") |
| Date | A date range Value (e.g., "Jan. 5, 2000 through Feb. 10, 2000) |
| Text | Free form ASCII text data without limits as to length |
| Relation | A relationship between Object Instances, where the Object Instances may be different Object Types (e.g., "a document Object Instance is related to a Person Object Instance). Relations are ordered (e.g., there may be a first person related to a document and then there may be a second person related to that same document). |

FIG. 2, generally at 200, shows a more detailed diagram of the system of the present invention that is shown in FIG. 1. In FIG. 2, the system user will input his/her requests to the system of the present invention using User PC/Input and Display Device ("User PC") 202. These requests will be transmitted to server environment 102 via line 203, which may be a hardwire or wireless network connection. The User PC may be part of a LAN, a MAN, a WAN, an intranet system, or the Internet-based system.

As described above, the communications from the User PC to XML interface 204 via line 203 is in the XML language. This will mean that the User PC is capable of generating requests in XML to effect proper communications between the User PC and the XML interface that is in XML layer 104, which itself is in server environment 102. Moreover, the User PC is also capable of receiving the responses in XML and appropriately displaying the received information for the user's consumption.

Although the present invention preferably uses XML for communications between the User PC and XML interface, a different language could be used, for example, Dynamic Hypertext Markup Language ("DHTML"). If a different language is used, layer 104 may be differently configured to accommodate this language and, as such, the interface may also be different and still be within the scope of the present invention.

XML interface 204 receives the requests that the system user formulates at User PC 202. The user requests may be made at the User PC through a common gateway interface ("CGI") or custom interface using an XML API ("Application Program Interface"). In the system of the present invention, preferably, at least five basic types of requests may be made using User PC 202; however, it is understood that a system that supports more or less than five basic types of requests is still within the scope of the present invention. The five basic types of requests are set forth if Table 2:

TABLE 2

Basic Requests

| Request No. | Request Type |
|---|---|
| 1. | FrameworkUpdateRequest |
| 2. | FrameworkDataRequest |
| 3. | ObjectUpdateRequest |
| 4. | ObjectDataRequest |
| 5. | SearchRequest |

The five requests are directed to the actions that may be carried out by the system of the present invention for the manipulation and retrieval of database information. Each of these types of requests performs a different function within the system of the present invention. Now each request will be discussed briefly:

A FrameworkUpdateRequest is a type of request that permits the user to create, modify, or delete basic UPIKM framework entities. The UPIKM framework entities that are being referred to, preferably include, but are not limited to, Databases, Objects, Fields, Categories, and Category Values.

A FrameworkDataRequest permits the system user to query the entities that have been created. This may take the form of the UPIKM database system being requested to provide a list of the Fields related to a particular Object in a Database. It could also be in the form of a request to provide a subset of the Values related to a particular Category.

An ObjectUpdateRequest is similar to the FrameworkUpdateRequest except that it permits the system user to create, modify, and delete Object Instances and all associated data rather than basic UPIKM framework entities. As an example, if a system user created an Object "Documents" in a Database, then ObjectUpdateRequest could be used to create Object Instances, such as From "John Doe."

An ObjectDataRequest will permit the system user to query Object Instances for information. As a demonstration of how this is done, the UPIKM database system may be queried to provide all of the Field data associated with the Object "Document" or to provide the "From" Field for the Object "Document."

A SearchRequest will permit the system user to find Object Instances given specific search criteria. The system of the present invention permits the criteria to be complex or simple. Moreover, a search may be performed in any combination to find a particular Object Instance. Using the SearchRequest command, the system user may use "Wildcard"-type text search queries. This also includes the capability to do "fuzzy" and "proximity"-type searching. As an example of the type of searching that may be accomplished, there maybe a search for all Documents that are From "John Doe" or "Jane Doe" but not to anyone whose name is 75% similar to "Smith," and the Documents must also be Related to someone in the "Person" Object who lives in a city with the word "New" in it.

Referring again to FIG. 2, XML interface 204 communicates with UPIKM database system 106 via two lines. Line 205 connects XML interface 204 to SQL-compliant database 108 and line 206 connects XML interface 204 to text search engine database 110 of UPIKM database system 106. As described, the two databases are shown disposed next to each other to represent that there is communications between the two for efficient searching and the rapid return of search results. The SQL-compliant database preferably is one that complies with known industry standards for SQL-databases and is configured to store data associated with system Objects. On the other hand, the text search engine database, which preferably is Texis Search Engine of Thunderstone, Inc., is configured to store information that permits "Wildcard"-type text searches in the stored data.

Preferably, the UPIKM database system is created by first choosing the names for the SQL-compliant database and text search engine database. Normally, the names for the two databases will be the same. Next, the SQL-compliant database is created with that name followed by the appropriate tables for that database. Once the SQL-compliant database is created, the text search engine database is created. Preferably, this database will include a set of files in at least one directory. This set of files will contain all of the text in all of the fields in the databases of the SQL-compliant database. Following creation of the text search engine database, the tables for this database must be created. After these actions have been completed, the UPIKM database system is ready for use.

Again referring to FIG. 2, consistent with the foregoing, it is seen that the SQL-compliant database will contain a number of tables that will permit the efficient and rapid retrieval of information. Line 207 is a tag line to the structure of SQL-complaint database 108. The first table that is shown is Database Table 208. Database Table 208 represents a listing of each of the unique databases that are contained in the SQL-compliant database. Each database will have a unique integer value, which is used in tracking information associated with that database.

Database Table 208 connects to Objects Table 209. Object Table 209, given the relational database structure of the SQL-compliant database, will contain uniquely identified objects that relate to each of the databases listed in Database Table 208.

Each of the objects in Object Table 209 will contain specific object instances. These object instances that relate to specific objects are listed in Object Instances Table 210. As is shown in FIG. 2, Object Table 209 and Object Instances Table 210 connect to Fields table 212 and Category Table 214. The connection shown in this manner represents the identification of the unique Objects and Object Instances in Field and Category Tables. This identification, again, is for the efficient and rapid retrieval of information from the databases.

Value Table 216 represents the values that are associated with the various categories, fields, object instances, objects, and databases of the SQL-compliant database. These values are transmitted to the text search engine database, which permits them to be text searchable.

In FIG. 2, line 223 is a tag line to the structure of text search engine database 110. Text Searchable Table 224 includes tables containing values in 224 and presents the values transferred from SQL-compliant database 108 from values table 216. Each of the tables in Text Searchable Table 224 will uniquely identify the categories, fields, object instances, objects, and databases, where appropriate, to provide efficient and rapid retrieval of information in response to search requests.

Figure 3B:
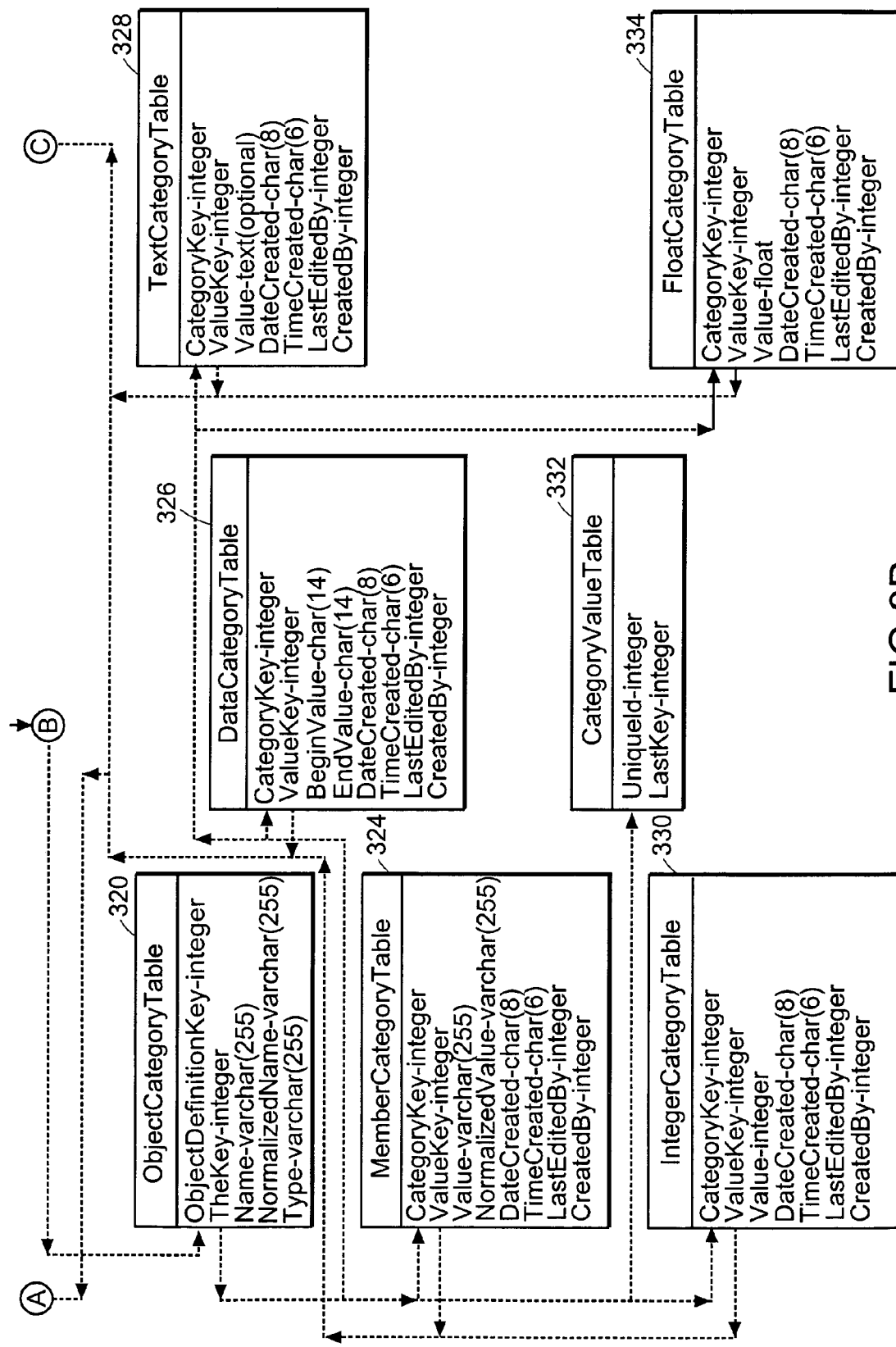
FIG. 3 shows the structure of the SQL-compliant database that is used in the UPIKM database system portion of the present invention.

Referring to FIG. 3, generally at 300, a more detailed view of the structure of SQL-compliant database 108 is shown. In understanding the structure and operation of SQL-compliant database 108, it is important to understand that this database achieves its efficiency and rapid response capability through the use, preferably, of four primary keys. These preferred primary keys are the Database key, the Object Definition key, the Object Field key, and the Category key. The four primary keys are unique across all databases of the SQL-compliant and text search engine databases. It is understood, however, that the system and method of the present invention may be based on more or less than four keys and still within the scope of the present invention.

Again referring to FIG. 3, each of the tables that is shown will include one of the four keys that will track that particular record to a specific Database. According to the present invention, each Database that is stored in SQL-compliant database 108 will be directed to different subject matter. For the purposes of the tables of the present invention, each application is referred to as a "Database" within "SQL-compliant database 108.

The first table is DatabaseWideKey Table 302. The DatabaseWideKeyTable tracks the last primary key that was used. This is necessary because the primary key types need to be unique across the entire database system. The first field in DatabaseWideKeyTable 302 is the "KeyId" field. This entry will identify the type of primary key that was assigned the last unique number. Thus, it could be a DatabaseKey, ObjectDefinitionKey, FieldKey, or CategoryKey. This identification may include up to 255 characters. So, each time a new record is created that uses one of the primary keys, it will increment this table. The second field of DatabaseWideKey Table 302 is the last key assigned to one of the primary keys. Therefore, this will provide the system user with information necessary to properly assign the primary keys with a unique value as the system is used.

The assignments that are made for the primary keys and tracked in DatabaseWideKey Table 302 are from Database Table 304, ObjectDefinition Table 306, ObjectField Table 318, and ObjectCategory Table 320. Therefore, it is understood that each of these tables would be connected to DatabaseWideKey Table 302 for the purpose of keeping it current with regard to the last primary key value that was used.

For purposes of example only, the last primary key used could be for a Database entitled "Vehicles for Transporting People." The unique value that was assigned to this Database may be integer value "27." Therefore, the first field of DatabaseWideKey Table 302 would be the type of primary key and the second field would be integer value for a key of that type. Thus, when the system user sought to create a new a Database, Object Definition, Object Field, and Object Category that requires a unique value across the entire database, that system user will know that the next value available for a primary key of that type, for example, could be "28."

Database Table 304 is used to track each of the Databases, i.e., applications, that have been created within SQL-compliant Database 108. This Table, preferably, includes three fields. The first field is "TheKey" field. This will be a unique integer value that is unique across the database. The second and third fields will contain information that is associated with that particular Database. Preferably, these fields will contain information regarding the Name of the Database as it was created and the NormalizedName of the Database. Each Database name may include up to 255 characters and its associated Normalized name also may include up to 255 characters. The Normalized Name field will be the upper case version of the name. As an example, a name and its associated normalized name could be "Vehicles for Transporting People" and "VEHICLES FOR TRANSPORTING PEOPLE," respectively. Although, each record of the Database Table 304 has been described to include three fields, it is understood that Database Table 304 may be configured to have two or more fields and still be within the scope of the present invention.

If a different Database, i.e., application, is created, the system user will first check DatabaseWideKey Table 302 to determine what the next available unique key value will be. If the last primary key value used was, for example, "102," then the system user in creating the next database record would select "103" and enter it in "TheKey" field of the Database Table record. The second field would be the name of the new Database which, for example, could be "Residential Living Quarters," which would be descriptive of the new databases subject matter. The third field would contain the Normalized Name which would be "RESIDENTIAL LIVING QUARTERS." A representative example of Database Table 304 is shown in Table 3 below:

TABLE 3

Database Table 304

| TheKey | Name (varchar (255)) | NormalizedName (varchar (255)) |
|---|---|---|
| 27 | Vehicles For Transporting People | VEHICLES FOR TRANSPORTING PEOPLE |
| 103 | Residential Living Quarters | RESIDENTIAL LIVING QUARTERS |

"TheKey" field of Database Table 304 connects to the DatabaseKey field of ObjectDefinition Table 306, Session Table 308, and Parameter Table 310. The DatabaseKey field in each of the three tables just noted would include the unique KeyId in the appropriate records associated with a specific Database, i.e., application. Therefore, for each of the Object/Session/Parameter Table records associated with the Database named "Vehicles for Transporting People," the primary key integer value "27" will be in the first field titled "DatabaseKey" field. And for each of the Objects/Sessions/Parameters Table records that are associated with the Database named "Residential Living Quarters," it will have the primary key value "103" in the "DatabaseKey" field. Accordingly, by these unique primary key values being associated with a particular Object/Session/Parameter Table record, it will identify such records as being associated with a particular Database, i.e., application, with nothing more viewing this one field.

Referring to ObjectDefinition Table 306, this table will include a record entry for each of the Object types that are associated with a particular Database, i.e., application. As stated, the first field of ObjectDefinition Table 306 is the DatabaseKey field. The second field is "TheKey" field. This field is to identify each of the Objects that are associated with a Database. Further, each Object for a Database will have a unique identifier integer value across the entire database. As such, there may be five different Objects for the Database "Vehicles for Transporting People." Since there are five separate Objects, each will be assigned a unique database wide key value. For example, these could be "35," "72," "191," "303," and "352."

The third field is the "Name" field for the Objects. For example, the last two Objects, integer values "303" and "352" for the Database, integer value "27," "Vehicles for Transporting People," could be "Land Vehicles" and "Water Vehicles," respectively. Preferably, these fields may include up to 255 characters. The fourth field is the NormalizedName field that also may include up to 255 characters. The NormalizedName field that is associated with the Name field, as stated, will be the upper case version of the name.

The fifth and sixth fields of ObjectDefinition Table 306 are data fields that are directed to the date and time of the creation of an Object. The fifth field is the "DateCreated" field that preferably is eight (8) characters long. The sixth field is the "TimeCreated" field that is preferably six (6) characters long.

The seventh and eighth fields of ObjectDefinition Table 306 are fields to identify the system user who last edited the record and who created the record in the first place. Each of these fields will contain an integer value which, when crossed to a look-up table, will indicate the system user who performed the specific action. In particular, the seventh field, "LastEditedBy," is directed to the system user who actually performed the last edit to the information contained in the record and the eighth field, "CreatedBy," is directed to the system user who first created the Object record. An example of ObjectDefinition Table 308 with the information discussed above is shown in Table 4 below:

which the system user may use to provide additional information relating to any of the Databases, i.e., application. The first field of Parameter Table 310 is the DatabaseKey that uniquely identifies the Database, i.e., application, to which that particular Parameter Table record refers. The second field is the ObjectKey field that is from ObjectName Table 314. The third field is directed to the Name of the particular parameter and may include up to 250 characters. Finally, the fourth field specifies the value for the parameter at issue and it will be set forth in this field in up to 255 characters.

Again referring to ObjectDefinition Table 306, as stated, the second field is "The Key" for each Object Definition and it connects to ObjectKey Table 312, ObjectName Table 314, ObjectPrefix Table 316, ObjectField Table 318, ObjectCategory Table 320, and ObjectData Table 322. The significance of this is that the ObjectDefinitionKey is one of the four keys that are used to identify an Object with a Database, i.e.,

TABLE 4

ObjectDefinition Table 306

| DB Key[1] | The Key | Name (varchar (255)) | Normalized Name (varchar (255)) | Date Created (char (8))[2] | Time Created (char (6))[3] | Last Edited By | Created By |
|---|---|---|---|---|---|---|---|
| 27 | 35 | Lighter Than Air Vehicles | LIGHTER THAN AIR VEHICLES | 20000115 | 100601 | 34 | 13 |
| 27 | 72 | Heavier Than Air Vehicles | HEAVIER THAN AIR VEHICLES | 20000228 | 034725 | 91 | 13 |
| 27 | 191 | Subsurface Vehicles | SUBSURFACE VEHICLES | 20010203 | 115516 | 22 | 06 |
| 27 | 303 | Land Vehicles | LAND VEHICLES | 20010520 | 024534 | 37 | 24 |
| 27 | 352 | Water (Surface) Vehicles | WATER (SURFACE) VEHICLES | 20010606 | 092309 | 21 | 11 |

[1]"DB" is for "Database.
[2]The data is in the format of year (4 characters)/month (2 characters)/day (2 characters).
[3]Time is in the format of hour (2 characters)/minute (2 characters)/seconds (2 characters).

The second table to which Database Table 304 connects, as stated, is Session Table 308. The Session Table maintains information regarding the sessions relating to each of the Objects for a particular Database. The first field of Session Table 308 is the DatabaseKey from Database Table 304. The second field is the UserKey field that will contain an integer, which through a cross-referencing look-up table, identifies the current system user.

The third field is the SessionKey. This field may contain any alpha-numeric combination up to 250 characters that will identify the session. For example, the SessionKey may be represented by a definition that is decided by the system user to uniquely name the session.

The fourth and fifth fields are directed to the date and time that a session relating to an Object is started. In particular, the fourth field is the "StartDate" field that preferably is eight (8) characters long and the fifth field is the "StartTime" field that is preferably six (6) characters long.

The sixth and seventh fields provide information regarding the date and time a session relating to an Object is ended. In particular, the sixth field is the "EndDate" field that preferably is eight (8) characters long, and the fifth field is the "EndTime" field that is preferably six (6) characters long.

Parameter Table 310 is the third Table that is connected to Database Table 304. The main purpose of Parameter Table is to retain information regarding certain system parameters, application, by simply knowing the ObjectDefinitionKey, without the need for knowing any other information. Now, each of the tables that connect to ObjectDefinition Table 306 will be discussed.

ObjectKey Table 312 is used to track the last key that was assigned to an Object Instance for a particular Object. An Object Instance is a subcategory of an Object Definition and each Object Instance will have a unique name for an Object Definition. The first field of ObjectKey Table 312 is the UniqueId field. This field will include an integer value of the unique key from ObjectDefinition Table 306. The second field, which is the titled "LastKey," identifies the last key integer value that was assigned to an Object Instance for the particular Object. This assignment will have been done through ObjectName Table 314, which will be discussed subsequently.

If the fourth record of Table 4 was the Object Definition key that was germane, the first field of the ObjectKey Table would be integer value "303." The second field would be the key integer value assigned to a last Object Instance. This integer value would be from ObjectName Table 314. The key integer value that is in the second field does not have to be unique across the entire system as does one of the primary keys, but it is unique with regard to a particular Object Definition. However, if the Object Instance key value is unique across the entire system, it is within the scope of the present invention.

ObjectName Table 314 maintains information regarding each Object Instance that is directed to a particular Object that was been created at ObjectDefinition Table 306. This table is used for tracking each of the Object Instances that are created. The data in the name column is reproduced in the text search engine database.

As stated, the first field of ObjectName Table 314 is the unique Object Definition key that is in the form of an integer value. This defines the Object to which each Object Instance relates. The second field is "TheKey" field for the ObjectName Table. This will be a unique identification for each Object Instance that is created and associated with a particular Object from ObjectDefinition Table 306. As an example, this may include particular "Land Vehicles" that would fall under this Object Definition such as "Automobiles," "Bicycles," "Trains," "Motorcycles," and "Trucks."

The third field is the Name field. Each name record will identify an Object Instance for a particular Object that was defined in ObjectDefinition Table 306. Preferably, this field may include up to 255 characters. The fourth field is the NormalizedName field, which also may include up to 255 characters. The NormalizedName field that is associated with the Name field will be the upper case version of the name.

The fifth and sixth fields of ObjectName Table 314 are data fields that are directed to the date and time of the creation of a particular Object Instance. The fifth field is the "DateCreated" field that preferably is eight (8) characters long. The sixth field is the "TimeCreated" field that is preferably six (6) characters long.

The seventh and eighth fields of ObjectName Table 314 are fields to identify the individual who last edited the record and who created the record in the first place. Each of these fields will contain an integer value which, when crossed to a look-up table, will indicate the individual who performed these specific actions. In particular, the seventh field, "LastEditedBy," is directed to the individual who actually performed the last edit to the information contained in the record, and the eighth field, "CreatedBy," is directed to the individual who created the Object name record. The integers in these fields will cross-reference to a name in a look-up table.

A representative ObjectName Table is shown in Table 5. This Table assumes the Database represented by integer value "27" for "Vehicles for Transporting People" and the Object Definition represented by integer value "303" for "Land Vehicles":

information on how specific Objects, Fields, and Values are related.

Again referring to FIG. 3, ObjectPrefix Table 316 and FieldDataCount Table 317 will be described. ObjectPrefix Table 316 is used to track the ASCII Prefixes that are used to create Ojbect Instance names. The first field of this Table is the ObjectDefinitionKey from ObjectDefinition Table 306. The second field in the specific prefix that is used with a particular Object Instance that is delineated in ObjectName Table 314. The second field may include up to 255 characters. The third field is the Suffix Count. This will include an integer value for the number of digits should follow that Prefix for each Object Instance. The final field is the "LastNumberUsed" field. This last field is an integer value for the last number used in the suffix that follows the Prefix.

The purpose of FieldDataCount Table 317 is to retain information regarding the number of Values for a particular Field associated with the Object Instances. The first field of FieldDataCount Table 317 is termed "FieldKey." This field contains the Field Key integer value from ObjectField Table 318. The second field is titled the "ValueKey" which will be from the applicable Category Table. Accordingly, this value could come from MemberCategory Table 324, DateCategory Table 326, TextCategory Table 328, IntegerCategory Table 330, CategoryValueKey Table 322, or FloatCategory Table 334. The third and last field of FieldDataCount Table 317 is termed "ValueCount." This field indicates the number of Object Instances that have this value.

As an example of FieldDataCount Table 317, in FIG. 4, the ObjectField table includes, at the fourth record, entries associated with a Field titled "Vehicle Weight." If that Field has thirty records for the Object Instances defined in "Table 5: Object Name Table 314," then this will be reflected in FieldDataCount Table 317.

The next table to which "TheKey" from ObjectDefinition Table 306 connects is ObjectField Table 318. This table maintains record information relating to all of the Fields that are associated with a particular Object defined by ObjectDefinition Table 306. Referring to Tables 4 and 5 above, for the Database represented by integer value "27" ("Vehicles for Transporting People"), the Object represented by integer value "303" ("Land Vehicles"), and the Object Name represented by the integer value "1" ("Automobiles"), a few representative Fields could be "Engine Displacement," "Fuel

TABLE 5

ObjectName Table 314

| Obj. Def. Key[4] | The Key | Name (varchar (255)) | NormalizedName (varchar (255)) | Date Created (char (8))[5] | Time Created (char (6))[6] | Last Edited By | Created By |
|---|---|---|---|---|---|---|---|
| 303 | 1 | Automobiles | AUTOMOBILES | 20010124 | 112507 | 21 | 13 |
| 303 | 2 | Bicycles | BICYCLES | 20010224 | 072237 | 70 | 13 |
| 303 | 2 | Trains | TRAINS | 20010512 | 063122 | 41 | 13 |
| 303 | 4 | Motorcycles | MOTORCYCLES | 20010621 | 030015 | 73 | 13 |
| 303 | 5 | Trucks | TRUCKS | 20010623 | 102517 | 70 | 13 |

[4]"Obj. Def." is for "ObjectDefinition.
[5]The data is in the format of year (4 characters)/month (2 characters)/day (2 characters).
[6]Time is in the format of hour (2 characters)/minute (2 characters)/seconds (2 characters).

"TheKey" of ObjectName Table 314 connects to Parameter Table 310 and ObjectData Table 322. The Sessions Table and its fields have been described, and ObjectData Table 322 and its fields will be explained in greater detail subsequently. It is to be noted at this time that ObjectData Table 322 maintains Type," "Tire Type," "Vehicle Weight," and "Transmission type." Noting the foregoing, ObjectField Table 318, preferably, will include thirteen fields for each Object Field record that is created. Each of these fields will now be described. However, it is to be understood that ObjectField Table 318 may have more or less than thirteen fields and still be within the scope of the present invention.

FIG. 4, generally at 400, shows a representative Object-Field Table 318. The first field of the Table at 402, as stated, is the ObjectDefinitionKey, which, in the present situation, is the integer value "303" to indicate the Object to which the Field relates is "Land Vehicles." The second field, as discussed briefly above, is for the Fields that have been created with regard to a particular Object. As shown in FIG. 4 at 404, "TheKey" has five records. Each of these records is represented by a unique integer. "TheKey" is the Field Key that is one of the four primary keys that are unique across the system databases.

The third and fourth fields at 406 and 408, respectively, are the "Name" and "Normalized Name" for each of the Object Fields. For example, for "TheKey" represented by integer value "378," the Name of the Field is "Engine Displacement" and the Normalized Name is "ENGINE DISPLACEMENT." Each of these entries may be up to 255 characters.

The fifth field at 410 is the "Type" field. This field is directed to maintaining information regarding the type of category to which the Field will belong. Referring to FIG. 3, the type of category could be a Member, Integer, Date, Text, Float category. The entry representative of the "Type" may be up to 255 characters. The sixth field at 412 is the "CategoryName" field. This field will include the normalized name for the entry in the Type Field at 410 Category. This field also may include up to 255 characters.

The next two fields are the seventh and eighth fields at 414 and 416, respectively. The seventh field is the "RelationField OtherObjectKey." This field will include an integer entry that is directed to another Object Definition to which the specific Field relates. The entry in this field will be the key integer value of the appropriate Relation Object. The eighth field is the "RelationFieldOtherFieldKey." This field will include an integer entry that is directed to another Field to which the specific Field relates. The entry in this field will be the key integer value of the appropriate Relation Field.

The ninth field at 418 is titled "OrderObjectsByValue." The purpose of this Field is to include information regarding the order to which this Field record relates to Object Instances associated with its Values. The entry in this field is an integer value. And the tenth field at 420 is the "Required" Field that contains data representative of whether the associated Object needs this particular field associated with it. This field may be up to 255 characters; however, preferably, this field may be a "R" for required or an "O" for optional.

The last three fields, the eleventh, twelfth, and thirteenth are shown at 422, 424, and 426, respectively. The eleventh field at 422 is the "MaximumValueAllowed" field that includes information regarding the greatest number of Values an Object Instance may have for a Field. The eleventh field 422 is represented by an integer value. The twelfth field at 424 is the "MinimumValue" field that is represented by up to 255 characters. This field will include the minimum value that a particular Field may assume for a Value. Similarly, the thirteenth field at 426 is the "MaximumValue" field that also may be up to 255 characters. This field will include the maximum value that a particular Field may assume for a Value.

The next table to which ObjectDefinition Table 306 connects is ObjectCategory Table 320. This Table is linked to the five Category Tables, which are MemberCategory Table 324, DateCategory Table 326, TextCategory Table 328, IntegerCategory Table 330, or FloatCategory Table 334. The five tables are configured to track five different types of Values that will be associated with an Object. Preferably, these are member, integer, date, text, and float values.

ObjectCategory Table 320 is used to define sets of Values for the Objects from ObjectDefinition Table 306. The first field in ObjectCategory Table 324, as stated, is the ObjectDefinitionKey from ObjectDefinition Table 306. The second field is "TheKey" field for the ObjectCategory Table. This key is the fourth primary key of the system of the present invention and is a unique integer value across all system databases.

The third field is the "Name" field that is the name of the Object Category and it may be up to 255 characters. An example of this field would be that under the Object Definition represented by integer value "303" ("Vehicles for Transporting People"), the Object Name represented by the integer value "1" ("Automobiles"), and the Object Field represented by the integer value "378" ("Engine Displacement"), the category could be "Vehicles with Four Wheels."

The fourth field is the "NormalizedName" field that corresponds to the Name field that is "VEHICLES WITH FOUR WHEELS." This field may also be up to 255 characters.

The fifth and last field is the "Type" field. This field may be up to 255 characters and will define the type of category it is. The type of category, preferably, may be one of five types that has been discussed, namely, the Member, Integer, Date, Text, or Float category. In this case, the entry could be "Member," "Text," or "Integer" and still be within the scope of the present invention. Each of the five types of categories will be subsequently explained in detail.

The last table to which the ObjectDefinitionKey of ObjectDefinition Table 306 connects is ObjectData Table 322. The contents of this table track all of the coded information about Object Instances, and Field and Value information that relate to it. The first field of ObjectData Table 322 is the ObjectDefinitionKey from ObjectDefinition Table 306. The second field is the ObjectKey from ObjectName Table 314. This will be the integer value for a particular Object Instance. The third field is the FieldKey from ObjectField Table 318.

The fourth field is the ValueKey, which is from one of Category Tables. The value that is provided could be from the MemberCategory Table 324, DateCategory Table 326, TextCategory Table 328, IntegerCategory Table 330, or FloatCategory table 334. These category tables will be subsequently discussed in detail.

The fifth and sixth fields are directed to the PrevValueKey and NextValueKey, respectively. The information in the Prev ValueKey field is to represent the Object Key of the Object Instance that precedes the current record. The NextValueKey field is to represent the Object Key of the Object Instance the follows the current record. Table 6 below is an example of ObjectData Table given the information in Tables 4 and 5, and FIG. 4:

TABLE 6

ObjectName Table 3314

| Obj. Def. Key[7] | Object Key | Field Key | Value Key | Previous Value Key | Next Value Key |
|---|---|---|---|---|---|
| 303 | 1 | 378 | 7001 | 0 | 2 |
| 303 | 2 | 383 | 2788 | 1 | 3 |
| 303 | 3 | 398 | 2597 | 2 | 4 |
| 303 | 4 | 403 | 5742 | 3 | 5 |
| 303 | 5 | 434 | 3337 | 4 | 6 |

[7]"Obj. Def." is for "ObjectDefinition.

As discussed briefly above, ObjectCategory Table 320 has a second field, "The Key," which will uniquely describe each object category across all system databases because it is one of the four primary keys of the system of the present invention. "TheKey" of Object Category Table 320 connects to six tables. These are MemberCategory Table 324, DateCategory Table 326, TextCategory Table 328, IntegerCategory Table 330, CategoryValueKey Table 322, and FloatCategory table 334. Except for CategoryValueKey Table 322, each of these tables is similarly constructed. Each of the six tables will now be discussed.

MemberCategory Table 324 is for retaining information relating to sets of values that are associated with a particular Object Field. In the case of the Member Category, as indicated in Table 1, the values will be up to 255 character ASCII values. For example, for the Object Definition represented by integer value "303" ("Vehicles for Transporting People"), the Object Instance represented by integer value "1" ("Automobiles"), the Object Field represented by integer value "378" ("Engine Displacement"), and Object Category "Vehicles with Four Wheels," the Member Categories could be "BMW," "Ford," General Motors," "Chrysler," and "Lexis." In this context, the fields for the Member Category will be discussed.

The first field of MemberCategory Table 324 is the CategoryKey from ObjectCategory Table 320. This would be the key for the "Vehicles with Four Wheels." The second field is the ValueKey field. This would be the unique integer value for one of the five members, namely, "BMW," "Ford," General Motors," "Chrysler," and "Lexis," and would be in the form of an integer.

The third field is the Value field and it may be up to 255 characters. An example of what may be contained in this field is "BMW." The fourth field is the "NormalizeName" field and it also may consist of up to 255 characters. The normalized name should correspond to the "Value" field as described previously.

The fourth and fifth fields of MemberCategory Table 324 are data fields directed to the date and time of the creation of this Member Category record for "BMW." The fourth field is the "DateCreated" field that preferably is eight (8) characters long. The fifth field is the "TimeCreated" field that is preferably six (6) characters long.

The sixth and seventh fields of MemberCategory Table 324 are fields to identify the individual who last edited the record and who created the record. Each of these fields contains an integer value which, when crossed referenced in an appropriate a look-up table, will indicate the individual who performed the described actions. The sixth field, "LastEditedBy," is directed to the individual who actually performed the last edit to the information contained in the record, and the seventh field, "CreatedBy," is directed to the individual who created this MemberCategory record. The integers in these fields will cross-reference to a name in a look-up table.

DateCategory Table 326 is for retaining information relating to sets of values for date ranges associated with a particular Object Field. Referring to Table 1, in the case of the Date Category, the values would be, for example, from a first date to a second date or just a single date. For example, for the Object Definition represented by integer value "303" ("Vehicles for Transporting People"), the Object Instance represented by integer value "1" ("Automobiles"), the Object Field represented by integer value "378" ("Engine Displacement"), and Object Category "Vehicles with Four Wheels," the Date Categories could be "19700101-19751231," "19760101-19801231," "19810101-19851231," "19860101-19901231," "19910101-19951231," and "19960101-20001231." Given these dates, the fields of the Date Category will be discussed.

The first field of DateCategory Table 326 is the CategoryKey from ObjectCategory Table 320. This would be the key for the "Vehicles with Four Wheels." The second field is the ValueKey field. This would be the unique integer value for one of the six ranges, namely, "1970-1975," "1976-1980," "1981-1985," "1986-1990," "1991-1995," and "1996-2000."

The third field is the BeginValue field and may be up to fourteen (14) characters. An example of what may be contained in this field would be an up to fourteen (14) character representation for "1996010" and/or the six characters for time. The fourth field is the EndValue field that also consists of fourteen (14) characters. An example of this value, consistent with the value in the third field, could be a value up to fourteen (14) characters of which "20001231052503" is representative.

The fifth and sixth fields of DateCategory Table 326 are data fields directed to the date and time of the creation of a Date Category record, for example, "1996-2000." The fifth field is the "DateCreated" field that preferably is eight (8) characters long. The sixth field is the "TimeCreated" field that is preferably six (6) characters long.

The seventh and eighth fields of DateCategory Table 326 are fields to identify the individual who last edited the record and who created the record. Each of these fields contains an integer value which, when crossed referenced in an appropriate look-up table, will indicate the individual who performed the actions. The seventh field, "LastEditedBy," is directed to the individual who actually performed the last edit to the information contained in the record, and the eighth field, "CreatedBy," is directed to the individual who created this DateCategory record. The integer values in these fields will cross-reference to a name in a look-up table.

TextCategory Table 328 is for retaining text data relating to a particular Object Field. Referring to Table 1, this text data will be in the form of free form ASCII text that is not limited as to length. As an example, for the Object Definition represented by integer value "303" ("Vehicles for Transporting People"), the Object Instance represented by integer value "1" ("Automobiles"), the Object Field represented by integer value "378" ("Engine Displacement"), and Object Category "Vehicles with Four Wheels," the free form text could be the following:

"The four wheel vehicles that are of importance are not SUV (Sport Utility Vehicles) but sedans that are primarily used for the paved road travel."

Given the above information, the fields of TextCategory Table 328 will be discussed.

The first field of TextCategory Table 328 is the CategoryKey from ObjectCategory Table 320. This would be the key for the "Vehicles with Four Wheels." The second field is the ValueKey field. This would be the unique integer value for the text such as what has been provided above.

The third field is the Value field, which is text and is optional. When the text is provided, it will be the full text and it will be searchable. The text may only be provided in Text Search Engine Database 110, rather than also at the third field of TextCategory Table 328.

The fourth and fifth fields of TextCategory Table 328 are data fields directed to the date and time of the creation of this Text Category record. The fourth field is the "DateCreated" field that preferably is eight (8) characters long. The fifth field is the "TimeCreated" field that is preferably six (6) characters long.

The sixth and seventh fields of TextCategory Table 328 are fields to identify the individual who last edited the record and who created the record. Each of these fields contains an integer value which, when crossed referenced in an appropriate a look-up table, will indicate the individual who performed the described actions. The sixth field, "LastEditedBy," is directed to the individual who actually performed the last edit to the information contained in the record, and the seventh field, "CreatedBy," is directed to the individual who created this TextCategory record. The integer values in these fields will cross-reference to a name in a look-up table.

IntegerCategory Table 330 is for retaining integer values that relate to a particular Object Field. Referring to Table 1, integer values to which this table is directed would be a number associated with a field. As an example, for the Object Definition represented by integer value "303" ("Vehicles for Transporting People"), the Object Instance represented by integer value "1" ("Automobiles"), the Object Field represented by integer value "378" ("Engine Displacement"), and Object Category "Vehicles with Four Wheels," the integer value could be "25" to represent the number of car manufacturers. Now, the fields of IntegerCategory Table 330 will be discussed.

The first field of IntegerCategory Table 330 is the CategoryKey from ObjectCategory Table 320. This would be the key for the "Vehicles with Four Wheels." The second field is the ValueKey field. This would be the unique integer value that tracks the number that is provided in the third field.

The third field is the Value field which in the case described above would be "25." The fourth and fifth fields of IntegerCategory Table 330 are data fields directed to the date and time of the creation of this Integer Category record. The fourth field is the "DateCreated" field that is preferably eight (8) characters long. The fifth field is the "TimeCreated" field that is preferably six (6) characters long.

The sixth and seventh fields of IntegerCategory Table 330 are fields to identify the individual who last edited the record and who created the record. Each of these fields contains an integer value which, when crossed referenced in an appropriate a look-up table, will indicate the individual who performed the described actions. The sixth field, "LastEditedBy," is directed to the individual who actually performed the last edit to the information contained in the record, and the seventh field, "CreatedBy," is directed to the individual who created this IntegerCategory record. The integers in these fields will cross-reference to a name in a look-up table.

FloatCategory Table 334 is for retaining values similar to those stored in IntegerCategory Table 330, except that these values are floating point numbers that relate to a particular Object Field. Referring to Table 1, floating point values to which this table is directed would be a floating point numbers associated with a particular field. As an example, for the Object Definition represented by integer value "303" ("Vehicles for Transporting People"), the Object Instance represented by integer value "1" ("Automobiles"), the Object Field represented by integer value "378" ("Engine Displacement"), and Object Category "Vehicles with Four Wheels," the float value could be "3.5" to represent the average number of doors for a vehicles of a particular type.

The first field of FloatCategory Table 334 is the CategoryKey from ObjectCategory Table 320. This would be the key for the "Vehicles with Four Wheels." The second field is the ValueKey field. This would be the unique integer value given to the floating point number that is provided in the third field.

The third field is the Value field, which in the case described above would be "3.5." The fourth and fifth fields of FloatCategory Table 334 are data fields directed to the date and time of the creation of this Integer Category record. The fourth field is the "DateCreated" field that is preferably eight (8) characters long. The fifth field is the "TimeCreated" field that is preferably six (6) characters long.

The sixth and seventh fields of FloatCategory Table 334 are fields to identify the individual who last edited the record and who created the record. Each of these fields contains an integer value which, when crossed referenced in an appropriate a look-up table, will indicate the individual who performed the described actions. The sixth field, "LastEditedBy," is directed to the individual who actually performed the last edit to the information contained in the record, and the seventh field, "CreatedBy," is directed to the individual who created this FloatCategory record. The integers in these fields will cross-reference to a name in a look-up table.

The last table that connects to ObjectCategory Table 320 is CategoryValueKey Table 332. CategoryValueKey Table 332 is used to track the last key that was assigned a Value for a given Category. Preferably, this would be one of the five categories that have been previously discussed.

The first field of CategoryValueKey Table 332 is the UniqueId field. This field will include an integer value to represent the key of the Category from ObjectCategory Table 320 to which the particular record relates. This would be from, namely, MemberCategory Table 324, DateCategory Table 326, TextCategory Table 328, IntegerCategory Table 330, or FloatCategory table 334. The second field, which is the LastKey field, indicates that last key number assigned to a Value for a particular Category. It is within the scope of the present invention that there may be a single table to track all of the Category Table types or a separate table for each of the five types of Categories.

Figure 5:
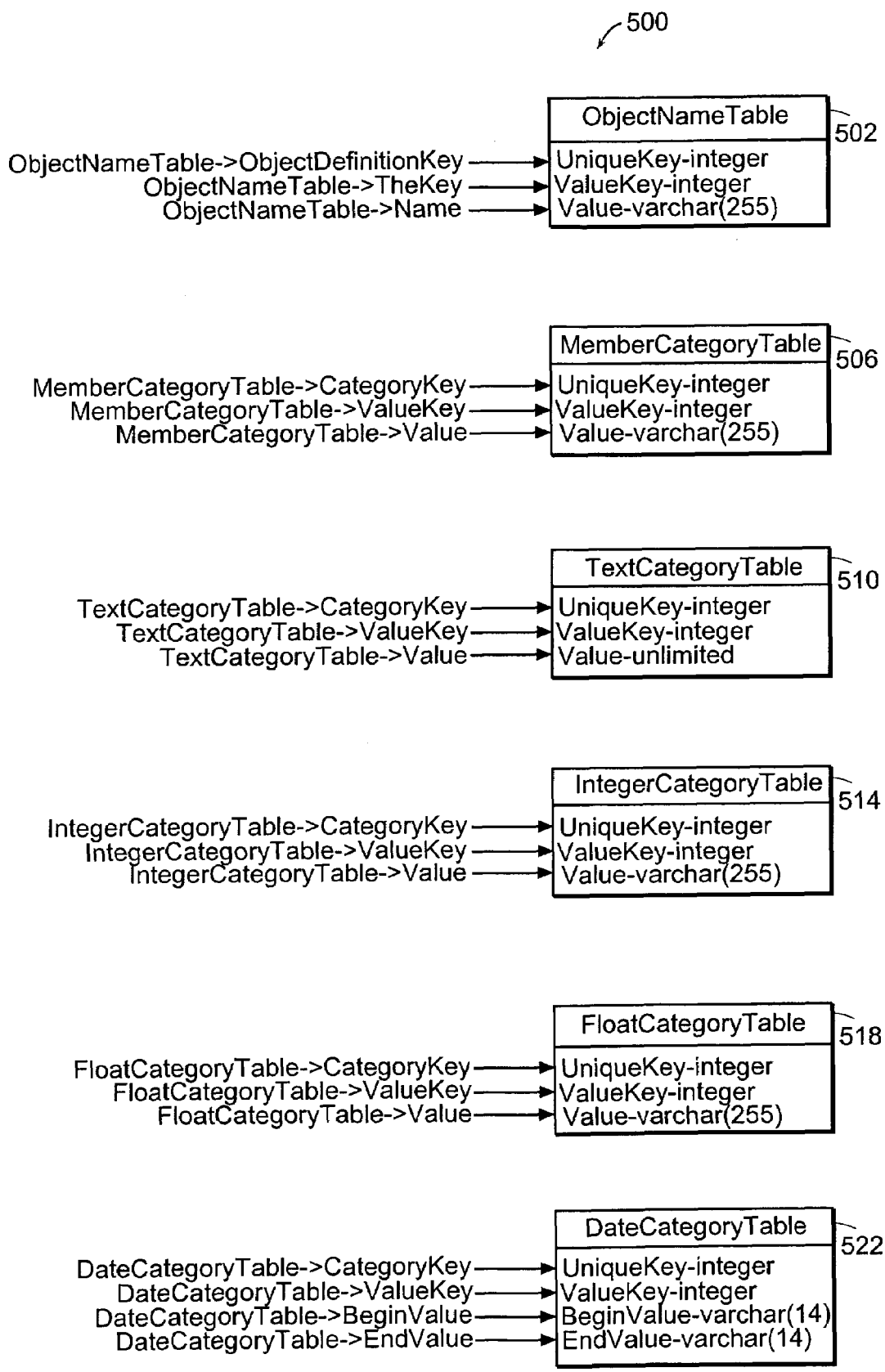
FIG. 5 shows the structure of the text search engine database that is used in the UPKIM database system portion of the present invention.

Referring to FIG. 5, generally at 500, Text Search Engine Database 110 will be described. Before discussing FIG. 5 in detail, FIG. 2 will briefly be discussed for an overview of Text Search Engine Database 110. In FIG. 2 at 224, the generic contents of Text Search Engine Database 110 are shown. These generic contents will be the information and values that are provided to Text Search Engine Database 110 from SQL-Compliant database 108. Each of the Tables will be linked so that knowledge of the keys will quickly point to the appropriate searchable database file. Although five searchable tables are shown in FIG. 2, there may be more or less than five tables and still be within the scope of the present invention.

Again referring to FIG. 5, there are six searchable tables shown. The specific structure of Text Search Engine Database 110 is to include a table relating to the Objects that have been created and the five Categories that have been created. It is to be understood that the Text Search Engine Database 110 could also be structured to include tables relating to Fields or Databases if desired. Therefore, FIG. 5 represents only an example of the structure of Text Search Engine Database 110.

ObjectName Table 502 in FIG. 5 is linked to ObjectName Table 314 in FIG. 3. The information that is contained in the records in ObjectName Table 502 is provided from ObjectName Table 314. Each of the records in ObjectName Table 502, preferably, will have three fields. As such, each Object that is created for a Database will have a record created in ObjectName Table 502.

The first field, which is termed the "UniqueKey," is the unique key that is received by the ObjectName Table 314 from ObjectDefinition Table 306. This is the ObjectDefinitionKey. This is an integer value.

The second field, which is shown as the "ValueKey," is an integer value that is from ObjectName Table 314. This is "TheKey" in ObjectName Table 314. The integer value that is found here will be a unique integer value across the entire database.

The third field is titled "Value." This field is from the Name field of ObjectName Table 314. This field will consist of up to 255 characters.

Each record of ObjectName Table 502 has been described as containing three fields. It is understood that there may be more or less than three fields for each record and still be within the scope of the present invention.

The remaining five tables of Text Search Engine Database 110 relate to the five category tables that are included in SQL-Compliant Database 106. Specifically, these category tables from SQL-Compliant Database 106 are MemberCategory Table 324, DateCategory Table 326, TextCategory Table 328, IntegerCategory Table 330, or FloatCategory table 334. Moreover, with regard to each of the remaining tables of the Text Search Engine Database 110, the information that they contain is similar in the sense of the fields that from each of the SQL-Compliant Databases are linked to Text Search Engine Database 110.

The first of the category tables in Text Search Engine Database 110 is MemberCategory Table 506. The first field of this table is titled "UniqueKey" and it is an integer value. This field will consist of the unique category key integer that was assigned when each of the member records was created in the SQL-Compliant Database.

The second field in MemberCategory Table 506 is titled "ValueKey." The field will be represented by an integer value. The value at this field will be the integer value assigned at the third field of MemberCategory Table 324. This integer will not conflict with any of the primary key integer values that have been assigned, but for the ValueKey, the integers do not have to be unique across the entire database. However, it is contemplated that the ValueKey integer values may be unique across the entire database and still be within the scope of the present invention.

The third field of MemberCategory Table 506 is titled "Value." This field is linked to the third field of MemberCategory Table 324. The third field of MemberCategory Table 506 may be member name such as "Doe" or "Smith," or other identifying representation up to 255 characters.

The second table of the category tables in Text Search Engine Database 110 is TextCategory Table 510. The first field of TextCategory Table 510 is identified as "UniqueKey." It is an integer value. This field will include the unique category key integer that was assigned when each of the text records was created in the SQL-Compliant Database.

The second field in TextCategory Table 510 is the "ValueKey" field. The field will be represented by an integer value. The integer value that is assigned to this field when a particular record of TextCategory Table 328 is created does not conflict with any of the primary key integer values that have been assigned. However, the integer values for ValueKey field do not have to be unique across the entire database, but it is understood that the ValueKey integer values may be unique across the entire database and still be within the scope of the present invention.

The third field of TextCategory Table 510 is titled "Value. However, if it is included, it will be the same as the third field of TextCategory Table 510. The third field of MemberCategory Table 506 will consist of free form ASCII text data that is not limited in length.

The third table of the category tables of Text Search Engine Database 110 is IntegerCategory Table 514. The first field of this table is the "UniqueKey" field. This field will have ant integer as an entry. The "UniqueKey" field will consist of the unique category key integer that was assigned when each of the Integer records was created in the SQL-Compliant Database.

The second field in IntegerCategory Table 514 is the "ValueKey" field. The field also will include an integer value as an entry. The integer value will be entered at the third field of IntegerCategory Table 330. This integer value that will be in this field will not conflict with any of the primary key integer values that have been previously assigned. The ValueKey, however, will be an integer value that does not have to be unique across the entire database. However, it is understood that the ValueKey integer value may be unique across the entire database and still be within the scope of the present invention.

The third field of IntegerCategory Table 514 is the "Value" field. The "Value" field derives its entry from the third field of IntegerCategory Table 330. The third field of IntegerCategory Table 514 will be an integer such as "10," "1552," or other integer. The integer in this field may be up to 255 characters.

The fourth category table that is shown in FIG. 5 is FloatCategory Table 518. The first field of FloatCategory Table 518 is identified as the "UniqueKey" field. The entry in this field will be an integer value. The entry will be the unique category key integer value that was assigned when each of the float records was created in the SQL-Compliant Database.

The second field in FloatCategory Table 518 is the "ValueKey" field. The field also will be represented by an integer value. The integer value assigned to this field when a particular record of FloatCategory Table 334 is created will not conflict with any of the primary key integer values that have been assigned. The integer values for ValueKey field, however, do not have to be unique across the entire database, but it is understood that they may be unique and still be within the scope of the present invention.

The third field of FloatCategory Table 518 is the "Value" field. The "Value" field is derived from the third field of IntegerCategory Table 334. The third field of FloatCategory Table 518 will be a floating point value such as "72.3," "10023.57," or other floating point value. The floating point number in this field may be up to 255 characters.

The fifth category table of Text Search Engine Database 110 is DateCategory Table 522. This table obtains its entries from its link to DateCategory Table 326 of SQL-Compliant Database 108. This table is different from the other category tables in that it has four fields instead of three.

The first field of DateCategory Table 522 is the "UniqueKey" field. The entry in this field will be an integer value. The entry will be the unique category key integer value that was assigned when each of the float records was created in the SQL-Compliant Database.

The second field of DateCategory Table 522, as it has been for the other category tables, is identified as "ValueKey" field. The "ValueKey" field is not one of the primary keys, so it does not have to be a unique integer value across the entire database. However, it is within the scope of the present invention to make the integers assigned to the "ValueKey" field unique across the entire database if desired by the system user.

The third field of DateCategory Table 522 is identified as the "BeginValue" field. This field is linked to the third field of DateCategory Table 326 in FIG. 5. The value that will be in this field of DateCategory Table 522 will represent a beginning date of a date range for an event or activity. This field entry may be up to fourteen characters.

The fourth field of DateCategory Table 522 is identified as the "EndValue" field. This field is linked to the fourth field of DateCategory Table 326 in FIG. 5. The value that will be in this field of DateCategory Table 522 will represent an ending date of a date range for an event or activity. This field entry may be up to fourteen characters.

In the foregoing, the structure of the system of the present invention has been described. As set forth in Table 2 above, there are five basic requests that are used in carrying out the method of the present invention. These are the FrameworkUpdate, FrameworkData, ObjectUpdate, ObjectData, and Search requests. These requests are generally made through XML layer 104 using and XML API. Alternatively, they may be made using some type of common gateway interface.

The FrameworkUpdate Request permits the system user to manage Databases, Objects, Fields, Categories and Category Values. Management in this context includes creating, modifying, and deleting records associated with Databases, Objects, Fields, Category and Category Values. The following is an example of a FrameworkUpdate Request in XML DTD (Document Type Definition).

```
<!ELEMENT FrameworkUpdateRequest
    ((CreateField | DeleteField | CreateDatabase | CreateObject |
DeleteObject | DeleteDatabase*) | Error)>
<!ATTLIST FrameworkUpdateRequest
    Object CDATA #IMPLIED><!--The name of the
Object--><!--The Object tag is optional only if the ELEMENT is a
"CreateDatabase," "CreateObject," or
```

-continued

```
"DeleteDatabase" tag, otherwise it is required-->
<!ELEMENT CreateField
    (FieldName, CategoryName, MaximumValuesAllowed?, Required?,
MinimumValue?, MaximumValue?)>
<!ELEMENT DeleteField (FieldName)>
```

The separate fields of the ELEMENT CreateField may then be described. This will mean that each of the listed fields will be addressed. An example of this is seen in the following XML representation.

```
<!ELEMENT FieldName (#PCDATA)><!--There are reserved Field Names.
    The name of the Object
    Date Created
    Date Edited
    Created By
    Edited By-->
<!ELEMENT CategoryName (#PCDATA)><!--This usually matches the FieldName-->
<!ELEMENT MaximumValuesAllowed (#PCDATA)><!This is a numeric value
representing the maximum number of values that an object may have in the Field. It will
default to "unlimited" which shows as a value of "0."-->
<!ELEMENT Required (#PCDATA)><!--This can be "O" for optional or "R" for
required. It will default to "O."-->
<!ELEMENT MinimumValue (#PCDATA)><!This is a numeric value representing the
minimum value that the Field may assume.-->
<!ELEMENT MaximumValue (#PCDATA)><!This is a numeric value representing the
maximum value that the Field may assume.-->
<!ATTLIST
    FieldName Type (member|text|date|integer|float|relation) #IMPLIED><!--The type
of field to create. This is required on a CreateField
    member - 255 character ASCII value
    text - free form text data
    date - this is a date type field that can handle a range of dates. The values are in the
    form yyyymmdd-yyyymmdd (and may include time).
    integer - integer
    float - float
    relation - links Object Instances to each other-->
<!ELEMENT CreateObject. (#PCDATA)><!--There are three Objects that are
automatically created when there is a CreateDatabase and there will be reserved Object Names
for them. These Objects are User, Group, and Security Objects.-->
<!ELEMENT DeleteObject (EMPTY)>
<!ELEMENT CreateDatabase (EMPTY)>
<!ELEMENT DeleteDatabase (EMPTY)>
<!ELEMENT FieldName (#PCDATA)><!--There are reserved Field Names.
    The name of the Object
    Date Created
    Date Edited
    Created By
    Edited By-->
<!ELEMENT Error (#PCDATA)><!--This is to hold errors that result from a
FrameworkDataRequest, which is output from a FrameworkUpdate Request.-->
    <!ELEMENT CreateObject....
    <!ELEMENT DeleteObject....
    <!ELEMENT CreateDatabase....
    <!ELEMENT DeleteDatabase...
```

From Table 2, the second basic request is the FrameworkDataRequest. This Request permits the system user to be able to obtain information about Fields, Objects, and Values. The following are simplified representations of the FrameworkDataRequest for Field, Object, and Value information. The request for Field information in XML is the following:

```
<!ELEMENT FrameworkDataRequest ((FieldData)* | Error)>
<!ATTLIST FrameworkDataRequest
    Object CDATA #REQUIRED><!--These will permit
```

-continued the system user to see the Fields that are in an Object and the specific
types. The amount of detail in what is retrieved is controllable.-->
<!ELEMENT Error (#PCDATA)><!--This is to hold errors that
result from a FrameworkUpdateRequest, which are output from
a FrameworkDataRequest.-->

The third basic request type from Table 2 is the ObjectUpdateRequest. The purpose of this Request is to permit the system user to be able to update information associated with Object Instances (Object Names). An example of such requests in XML is set forth in the following:

```
<!ELEMENT ObjectUpdateRequest ((ObjectData)* | Error)>
<!ATTLIST ObjectUpdateRequest
      Object CDATA #REQUIRED>
<!ELEMENT ObjectUpdate (ObjectNumber, (AllFields | FieldName*))*>
<!ELEMENT ObjectNumber (Create | Number | Search)*>
<!ELEMENT Create (Number | Prefix | Default)*>
<!ATTLIST Create
      HowMany CDATA "1"><!--This permits the system user to create many Object
Instances at once. It is applicable for the "Prefix" or "Default" tags.-->
<!ELEMENT Number (#PCDATA)><!--Create an Object Instance with a particular
value. This may be up to 255 characters.-->
<!ELEMENT Prefix (#PCDATA)><!--Create an Object Instance with a particular Prefix.
The System will create a unique "Number" using the Prefix.-->
<!ELEMENT Default EMPTY><!--The system is used to create the Object Instance
"Number" using the default Prefix for a Database. The default "Default" Prefix is an
empty Prefix.-->
<!ELEMENT Delete EMPTY><!--This will cause the ObjectNumbers to be deleted.-->
<!ELEMENT CodeField (FieldName, (DeleteAllValues | (AddValue | DeleteValue)*))>
<!ELEMENT AllFields EMPTY><!--This will display all of the values for any field that
has data for Object requested-->
<!ELEMENT FieldName (#PCDATA)><!--There are reserved Field Names.
      The name of the Object
      Date Created
      Date Edited
      Created By
      Edited By-->
<!ELEMENT DeleteAllValues EMPTY><!--Delete any values for this Field that is associated
with the ObjectNumbers. This combined with an "AddValue" is a "replace."-->
<!ELEMENT AddValue (Value)*><!--Add values to a Field for ObjectNumbers.-->
<!ELEMENT DeleteValue (value)*><!--Delete a particular value(s) from
ObjectNumbers.-->
<!ELEMENT Error (#PCDATA)><!--This is only to hold errors that result from an
ObjectDataRequest, which are output from an ObjectUpdateRequest.-->
```

The fourth type of Request, as shown in Table 2 above, is an ObjectDataRequest. This type of Request will permit the system user to obtain desired information about the values associated with the Object Instances (Object Names) that have been created. An XML example that is representative of the OBjectDataRequest will now be shown:

```
<!ELEMENT ObjectDataRequest ((ObjectData)* | Error)>
<!ATTLIST ObjectDataRequest
      Object CDATA #REQUIRED>
<!ELEMENT ObjectData (ObjectNumber, (AllFields | FieldName*))*>
<!ELEMENT ObjectNumber (Create | Number | Search)*><!--Create is not used in a
ObjectDataRequest but it is used in an ObjectUpdateRequest-->
<!ELEMENT Number (#PCDATA)><!--A particular ObjectNumber (ID)-->
<!ELEMENT AllFields EMPTY><!--This will display all of the values for any field that
has data for Object requested-->
<!ELEMENT FieldName (#PCDATA)><!--There are reserved Field Names.
      The name of the Object
      Date Created
      Date Edited
      Created By
```

```
        Edited By-->
<!ELEMENT Search (Element*)>
<!ATTLIST Search
    Object CDATA #REQUIRED>
<!ELEMENT Element (FieldName, Value)>
<!ELEMENT FieldName (#PCDATA)>
<!ELEMENT Value (#PCDATA)>
<!ATTLIST Element
    Type (Criteria | Conjunction) #REQUIRED
    Conjunction (and | or | excl) #IMPLIED><!--This is required if the Type is a
"Conjunction"-->
<!ATTLIST Value
    Type (EQ | NE | GT | LT | GE | LE | ANY | NONE | WILDCARD) #REQUIRED>
<!--The first six options are EQ = equals; NE = not equal; GT = greater than; LT = less
than; GE = greater or equal to; and LE = less than or equal to. The remain three are:
    ANY = Get Objects having a value for this Field. The PCDATA (if there) is
ignored.
    NONE = Get Objects having no value for this Field. The PCDATA (if there) is
ignored.
    WILDCARD = The Value has specific search syntax.-->
<!ELEMENT Error (#PCDATA)><!-- This is to hold errors that result from a
ObjectUpdateRequest, which are output from an ObjectDataRequest-->
```

The fifth basic Request, as delineated in Table 2, is a SearchRequest. This last Request has been described in conjunction with the ObjectDataRequest. However, the SearchRequest may exist as a root element and as such an XML example is also provided here:

```
<!ELEMENT Search (Element*)>
<!ATTLIST Search
    Object CDATA #REQUIRED>
<!ELEMENT Element (FieldName, Value)>
<!ELEMENT FieldName (#PCDATA)>
<!ELEMENT VALUE (#PCDATA)>
<!ATTLIST Element
    Type (Criteria | Conjunction) #REQUIRED
    Conjunction (and | or | excl) #IMPLIED><!--This is required
if the Type is a "Conjunction"-->
<!ATTLIST Value
    Type (EQ | NE | GT | LT | GE | LE | ANY | NONE |
WILDCARD) #REQUIRED>
<!--The first six options are EQ = equals; NE = not equal; GT =
greater than; LT = less than; GE = greater or equal to; and LE =
less than or equal to. The remain three are:
    ANY = Get Objects having a value for this Field. The
PCDATA (if there) is ignored.
    NONE = Get Objects having no value for this Field. The
PCDATA (if there) is ignored.
    WILDCARD = The Value has specific search syntax.-->
<!ELEMENT Error (#PCDATA)><!--This is only to hold errors
that result that is appropriate for the particular SearchRequest.-->
```

The system and method of the present invention are configured so that the system user may place two or more root elements in a single XML file. If this is done, the same element will be returned at the root element with the requests associated with the element as sub-elements. The following is representative of an XML file that contains more than one root element:

```
<!ELEMENT DatabaseRequest (FrameworkDataRequest |
FrameworkUpdateRequest | ObjectDataRequest |
ObjectUpdate Request | Search)>
```

Figures 6, 6A:
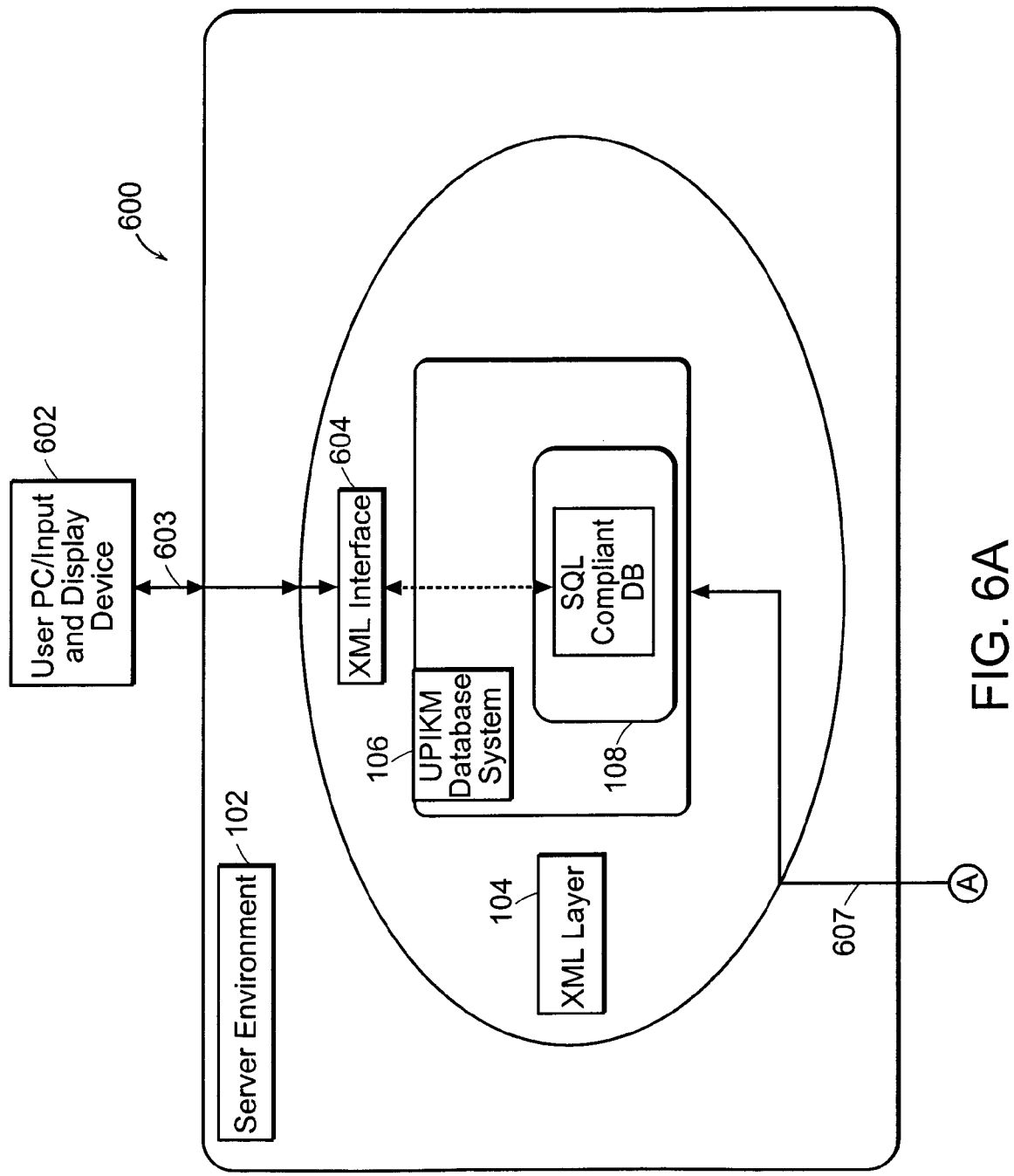
FIG. 6 is a more detailed diagram of the present invention shown in FIG. 1 that includes the UPIKM database system that integrates the XML interface and uses at least one database type.
Figure 6B:
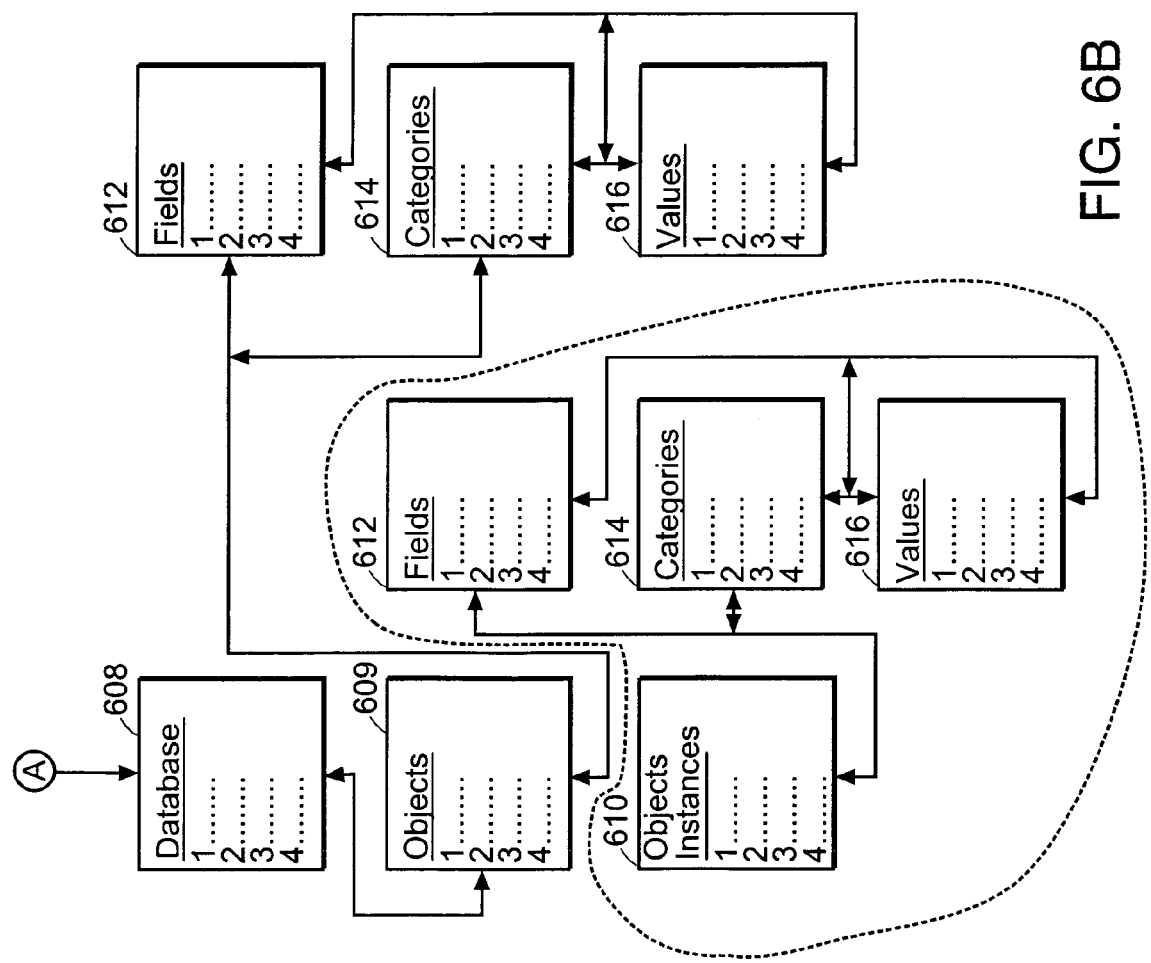

Referring to FIG. 6, the embodiment of the present invention that includes only the SQL-compliant database is shown generally at 600. In describing FIG. 6, the following terms will have the meanings as set forth below:

UPIKM Database: This is the SQL-compliant database.

Database: This refers to a subset of the UPIKM Database that maintains information for an identifiable application.

Objects: These are the types of entities that have data associated with them. For example, "Document," "Person," and "Company" may be Objects.

Fields: These are pieces of information that may be associated with an Object. For example, "LastName" may be a "Field" associated with a "Person" Object, and "From" and "Document Type" may be "Fields" associated with a Document Object.

Categories: These are sets of Values of a particular type that are associated with Fields. For example, "People" may be a Category that contains the set of names that a Document could be "From."

Values: These are of what Categories may consist. The "Last Name" Category may have a set of Values such as "Doe," "Smith," and "Jones." The set of Values in a Category shares the same "Type."

When the SQL-compliant databases are created, it is also contemplated but not required that new tables and indexes also be created. In considering "Databases," there may be many databases in the SQL-compliant database. For example, one database may be created to track documents while another may be created to track stock trades. These two databases may co-exist in a single UPIKM database. It is also contemplated that these two databases may be kept in separate UPIKM databases.

As discussed in describing the first embodiment of the present invention, the Object Instances will have unique names associated with them. This convention will permit two users or application programs to communicate about a particular Object Instance and not refer to the same entity. A set of Values in a Category will be of the same type. The Category types in a UPIKM database system following the previously discussed embodiment, which is set forth in Table 1 above.

In FIG. 6, the system user will input his/her requests to the system of the present invention using User PC/Input and Display Device ("User PC") 602. These requests will be transmitted to server environment 102 via line 603, which may be a hardwire or wireless network connection. The User PC may be part of a LAN, a MAN, a WAN, an intranet system, or the Internet-based system.

As described above, the communications from the User PC to XML interface 604 is via line 603 is in the XML language. This will mean that the User PC is capable of generating requests in XML to effect proper communications between the User PC and the XML interface that is in XML layer 104, which itself is in server environment 102. Moreover, the User PC is also capable of receiving the responses in XML and appropriately displaying the received information for the user's consumption.

Although the present invention preferably uses XML for communications between the User PC and XML interface, a different language could be used, for example, Dynamic Hypertext Markup Language ("DHTML"). If a different language is used, layer 104 may be differently configured to accommodate this language and, as such, the interface may also be different and still be within the scope of the present invention.

XML interface 604 receives the requests that the system user formulates at User PC 602. The system user requests, as in the previous embodiment, may be made at the User PC through a common gateway interface ("CGI") or custom interface using an XML API ("Application Program Interface"). In the system of the present invention, preferably at least five basic types of requests may be made using User PC 602; however, it is understood that a system that supports more or less than five basic types requests is still within the scope of the present invention. The five basic types of requests are the same as in the first embodiment, which is provided in Table 2 above, and the descriptions of these requests applies equally to this second embodiment.

In FIG. 6, XML interface 604 communicates with UPIKM database system 106 via line 605. Line 605 connects XML interface 604 to SQL-compliant database 108. As before, the SQL-compliant database preferably is one that complies with known industry standards for SQL-databases and is configured to store data associated with system Objects.

When the UPIKM database system is created, the name for the SQL-compliant database is selected. Next the SQL-compliant database is created with that name followed by the appropriate tables for that database. After these actions have been completed, the UPIKM database system is ready for use.

As discussed above, the SQL-compliant database will contain a number of tables that will permit the efficient and rapid retrieval of information. Line 607 is a tag line to the structure of SQL-complaint database 108. The first table that is shown is Database Table 208. Database Table 608 represents a listing of each of the unique databases that are contained in the SQL-compliant database. Each database will have a unique integer value, which is used in tracking information associated with that database.

Database Table 608 connects to Objects Table 609. Object Table 609, given the relational database structure of the SQL-compliant database, will contain uniquely identified objects that relate to each of the databases listed in Database Table 608.

Each of the objects in Object Table 609 will contain specific object instances. These object instances that relate to specific objects are listed in Object Instances Table 610. As is shown in FIG. 2, Object Table 609 and Object Instances Table 610 connect to Fields table 612 and Category Table 614. The connection shown in this manner represents the identification of the unique Objects and Object Instances in Field and Category Tables. This identification, again, is for the efficient and rapid retrieval of information from the databases. Value Table 616 represents the values that are associated with the various categories, fields, object instances, objects, and databases of the SQL-compliant database.

FIG. 3 provides a more detailed view of the structure of SQL-compliant database 108. The structure and operation of SQL-compliant database 108 that was set forth for the first embodiment of the present invention is substantially the same for the second embodiment that is shown in FIG. 6, except that it does not connect to a text search engine database. Therefore, the SQL-compliant database achieves its efficiency and rapid response capability through the use, preferably, of four primary keys. As before, these primary keys are preferably the Database key, the Object Definition key, the Object Field key, and the Category key. The four primary keys are unique across all databases of the SQL-compliant and text search engine databases. It is understood, however, that the system method of the present invention may be based on more or less than four keys and still within the scope of the present invention.

Again referring to FIG. 3, the tables that are shown are also in the SQL-compliant database shown in FIG. 6. Preferably, the SQL-compliant database of the second embodiment will have tables that include the fields that are set forth in FIG. 3. Accordingly, FIG. 3 and the descriptions of the tables, their contents, and the operation of this database are incorporated by reference in the SQL-compliant database of FIG. 6. Further, FIG. 4, which is directed to an ObjectField Table, and the associated descriptions of this Figure, apply equally to the second embodiment present invention shown in FIG. 6 and are incorporated by reference.

The terms and expressions that are employed herein are terms of description and not of limitation. There is no intention in the use of such terms and expressions of excluding the equivalents of the feature shown or described, or portions thereof, it being recognized that various modifications are possible within the scope of the invention as claimed.

The invention claimed is:

1. A control system for use with knowledge-based database systems, comprising:
    (a) an input and display device that is used by system users to interact with a knowledge-based database system; and
    (b) a service environment that is in communication with the input and display device, with the service environment including at least a communications layer for communications between the input and display device and knowledge-based database system when a predetermined communications language is used for such communication and the predetermined communications language is programmed by the system users to perform creation, deletion, or editing of system databases, with the system users programming the creation, deletion, or editing of system databases using the predetermined communications language without a need to have knowledge of a hierarchy of first or second database types of system databases of the knowledge-based database system; and
    (c) the knowledge-based database system, which includes system databases that are of two database types and a database management system, a first database type of system database for storage of data information according to a predetermined hierarchy that includes predetermined search controls to reduce a number of requests required to access, edit, or save data information in the first database type of system database, and a second database type of system database for storage of value information for controlling an ability to search the data information of the first database type of system database for the purpose of accessing, editing or saving data information in the first database type of system database without the value information stored in the second database type of system database having knowledge of the type of data information stored in the first database type of system database, and further with the first database type of system database being integrated with the second database type of system database for such accessing, editing, or saving data information in the first database type of system database.

2. The control system as recited in claim 1, wherein the input and display device includes a personal computer.

3. The control system as recited in claim 1, wherein the input and display device includes a workstation computer.

4. The control system as recited in claim 1, wherein the communications layer of the service environment is an object-oriented layer.

5. The control system as recited in claim 4, wherein the communications layer is an Extensible Mark-up Language ("XML") communications layer.

6. The control system as recited in claim 5, wherein the predetermined communications language is XML.

7. The control system as recited in claim 6, wherein the XML is used to communicate from the input and display device to the database management system and from the database management system to the input and display device.

8. The control system as recited in claim 1, wherein the first database type of system database includes a relational database type.

9. The control system as recited in claim 8, wherein the relational database type includes a structured query language ("SQL") compliant database.

10. The control system as recited in claim 9, wherein the SQL-compliant database includes a plurality of related tables.

11. The control system as recited in claim 10, wherein the search controls are incorporated in a structure of the tables of the SQL-compliant database.

12. The control system as recited in claim 11, wherein the search controls include primary keys that relate the plurality of tables of the SQL-compliant database.

13. The control system as recited in claim 12, wherein the predetermined number of primary keys includes more than two.

14. The control system as recited in claim 12, wherein the predetermined number of primary keys includes four.

15. The control system as recited in claim 13 or 14, wherein the second database type of system database includes a relational database type.

16. The control system as recited in claim 15, wherein the relational database type includes a text search engine database.

17. The control system as recited in claim 16, wherein the text-search engine database includes a plurality of tables.

18. The control system as recited in claim 17, wherein the contents of the tables of the text search engine database include primary key values from the SQL-compliant database that are used for controlling access to data information in the SQL-compliant database.

19. A method for accessing databases of a knowledge-based database system, comprising the steps of:
(a) a system user on an input and display device formulating a request to create, delete, or edit a database of the knowledge-based database system in a predetermined communications language without knowledge of a hierarchy of first or second database types of a knowledge-based database system;
(b) communicating the request formulated by the system user at step (a) from the input and display device to the knowledge-based database system using the predetermined communications language through a communications layer compatible for transmitting the requests formulated in the predetermined communications language;
(c) processing at the knowledge-based database system the request in the predetermined communications language that are received from the input and display device according to the substeps of:
(1) translating at a database management system of the knowledge-based database system the requests in the predetermined communications language to communications signals compatible for communications between the database management system and system databases having the hierarchy of the first and second database types;
(2) interacting with system databases of the first database type according to the translated requests as controlled by value information stored in the system databases of the second database type without the value information stored in the second database type of system database having knowledge of the type of data information stored in the first database type of system database, with the first database type of system database being integrated with the second database type of system database for accessing, editing, or saving data information in the first database type of system database;
(3) retrieving responsive data information from the system databases according to the translated requests and returning the responsive data information to the database management system;
(4) translating at the database management system the communications signals representative of the responsive data information retrieved at step (c)(3) to responsive data information in the predetermined communications language;
(d) communicating the responsive data information in the predetermined communications language from the knowledge-based database system to input and display device; and
(e) displaying the responsive data information on the input and display device.

20. The method as recited in claim 19, wherein the predetermined communications language is Extensible Mark-up Language ("XML").

21. The method as recited in claim 19, wherein the first database type includes a relational database type.

22. The method as recited in claim 21, wherein the relational database type includes a structured query language ("SQL") compliant database.

23. The method as recited in claim 22, wherein the SQL-compliant database includes a plurality of related tables.

24. The method as recited in claim 23, wherein search controls for the first database type are incorporated in a structure of the tables of the SQL-compliant database.

25. The method as recited in claim 24, wherein the search controls include primary keys that relate the plurality of tables of the SQL-compliant database.

26. The method as recited in claim 25, wherein the predetermined number of primary keys includes more than two.

27. The method as recited in claim 25, wherein the predetermined number of primary keys includes four.

28. The method as recited in claim 26 or 27, wherein the second database type of system database includes a relational database type.

29. The method as recited in claim 28, wherein the relational database type includes a text search engine database.

30. The method as recited in claim 29, wherein the text search engine database includes a plurality of tables.

31. The method as recited in claim 30, wherein the contents of the tables of the text search engine database include primary key values from the SQL-compliant database that are used for controlling access to data information in the SQL-compliant database.

32. A control system for use with knowledge-based database systems, comprising:
an input and display device that is used by system users to interact with a knowledge-based database system; and
a service environment that is in communication with the input and display device, with the service environment including at least a communications layer for communications between the input and display device and knowledge-based database system when a predetermined communications language is used for such communications and the predetermined language is programmed by the system users to perform creation, deletion, or editing of system databases, with the system users programming creation, deletion, or editing of system databases using the predetermined communications language without a need to have knowledge of a hierarchy of a first database type of system database of the knowledge-based database system, and further with the first database type of system database having integrated therewith a structure for accessing, editing, or saving data information in the first database type of system database; and
the knowledge-based database system, which includes system databases that are of the first database type of system database and a database management system, with the first database type of system database for storage of data information according to a predetermined hierarchy that includes predetermined search controls that perform searches without knowledge of data information stored in the first database type of system database, and further with the search controls also reducing a number of requests required to access, edit, or save data information in the first database type of system database.

33. The control system as recited in claim 32, wherein the input and display device includes a personal computer.

34. The control system as recited in claim 32, wherein the input and display device includes a workstation computer.

35. The control system as recited in claim 32, wherein the communications layer of the service environment is an object-oriented layer.

36. The control system as recited in claim 35, wherein the communications layer is an Extensible Mark-up Language ("XML") communications layer.

37. The control system as recited in claim 36, wherein the predetermined communications language is XML.

38. The control system as recited in claim 37, wherein the XML is used to communicate from the input and display device to the database management system and from the database management system to the input and display device.

39. The control system as recited in claim 32, wherein the first database type of system database includes a relational database type.

40. The control system as recited in claim 39, wherein the relational database type includes a structured query language ("SQL") compliant database.

41. The control system as recited in claim 40, wherein the SQL-compliant database includes a plurality of related tables.

42. The control system as recited in claim 41, wherein the search controls are incorporated in a structure of the tables of the SQL-compliant database.

43. The control system as recited in claim 42, wherein the search controls include primary keys that relate the plurality of tables of the SQL-compliant database.

44. The control system as recited in claim 43, wherein the predetermined number of primary keys includes more than two.

45. The control system as recited in claim 43, wherein the predetermined number of primary keys includes four.

46. A method for accessing databases of a knowledge-based database system, comprising the steps of:
(a) a system user on an input and display device formulating a request to at least create, delete, or edit a database of the knowledge-based database system in a predetermined communications language without a knowledge of a hierarchy of at least one database type of system database of a knowledge-based database system, with the one database type of system database having integrated therewith a structure for, accessing, editing, or saving data information in the one database type of system database;
(b) communicating the request formulated by the system user at step (a) from the input and display device to the knowledge-based database system using the predetermined communications language through a communications layer compatible for transmitting the requests formulated in the predetermined communications language;
(c) processing at the knowledge-based database system the requests in the predetermined communications language that are received from the input and display device according to the substeps of:
(1) translating at a database management system of the knowledge-based database system the request in the predetermined communications language to communications signals compatible for communications between the database management system and system data databases having the hierarchy of the database type;
(2) interacting with system databases of the one database type according to the translated requests;
(3) retrieving responsive data information from the system databases without the structure having knowledge of the type of data information, with the retrieving of data information being according to the translated requests and returning the responsive data information to the database management system; and
(4) translating at the database management system the communications signals representative of the responsive data information retrieved at step (c)(3) to responsive data information in the predetermined communications language;
(d) communicating the responsive data information in the predetermined communications language from the knowledge-based database system to the input and display device; and
(e) displaying the responsive data information on the input and display device.

47. The method as recited in claim 46, wherein the predetermined communications language is Extensible Mark-up Language ("XML").

48. The method as recited in claim 46, wherein the database type includes a relational database type.

49. The method as recited in claim 48, wherein the relational database type includes a structured query language ("SQL") compliant database.

50. The method as recited in claim 49, wherein the SQL-compliant database includes a plurality of related tables.

51. The method as recited in claim 50, wherein search controls for the first database type are incorporated in a structure of the tables of the SQL-compliant database.

52. The method as recited in claim 51, wherein the search controls include primary keys that relate the plurality of tables of the SQL-compliant database.

53. The method as recited in claim 52, wherein the predetermined number of primary keys includes more than two.

54. The method as recited in claim 52, wherein the predetermined number of primary keys includes four.

* * * * *